US012216851B2

(12) United States Patent
Owens et al.

(10) Patent No.: US 12,216,851 B2
(45) Date of Patent: Feb. 4, 2025

(54) MULTI-DIRECTIONAL TEXTURE BASED INPUT DEVICE

(71) Applicant: Apple Inc., Cupertino, CA (US)

(72) Inventors: Travis N. Owens, Lakeway, TX (US); Daniel J. Bechstein, Pacifica, CA (US); Jeremy A. Bagnol, San Jose, CA (US); Daniell Dokko, Sunnyvale, CA (US); Supratik Datta, Saratoga, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/461,395

(22) Filed: Sep. 5, 2023

(65) Prior Publication Data
US 2024/0103654 A1 Mar. 28, 2024

Related U.S. Application Data

(60) Provisional application No. 63/376,991, filed on Sep. 23, 2022.

(51) Int. Cl.
G06F 3/041 (2006.01)
(52) U.S. Cl.
CPC .................. G06F 3/0414 (2013.01)
(58) Field of Classification Search
CPC ..................................... G06F 3/0414
See application file for complete search history.

(56) References Cited

U.S. PATENT DOCUMENTS 3,673,327 A  6/1972  Johnson et al.
4,506,354 A  3/1985  Hansen
4,746,914 A  5/1988  Adler
4,825,212 A  4/1989  Adler et al.
5,483,261 A  1/1996  Yasutake
5,488,204 A  1/1996  Mead et al.
5,591,945 A  1/1997  Kent
5,766,493 A  6/1998  Shin
5,825,352 A  10/1998  Bisset et al.
5,835,079 A  11/1998  Shieh
(Continued)

FOREIGN PATENT DOCUMENTS

EP  2385446 A1  11/2011
JP  2000-163031 A  6/2000
(Continued)

OTHER PUBLICATIONS

Final Office Action received for U.S. Appl. No. 12/184,232, mailed on Aug. 27, 2013, 26 pages.
(Continued)

Primary Examiner — Gustavo Polo
(74) Attorney, Agent, or Firm — Kubota & Basol LLP

(57) ABSTRACT

Electronic devices can include a textured exterior surface that is used for controlling functions associated with the electronic device or another electronic device when an object moves along the textured exterior surface. In some examples, the textured exterior surface can be a multi-directional textured surface to enable multi-directional touch functionality. In some examples, sensors of the electronic device can detect signal inputs generated by vibrations caused by the object moving along the textured exterior surface. The signal inputs can be processed to determine the directionality and/or speed of the movement input.

20 Claims, 9 Drawing Sheets

(56) References Cited

U.S. PATENT DOCUMENTS

| | | | |
|---|---|---|---|
| 5,854,450 | A | 12/1998 | Kent |
| 5,880,411 | A | 3/1999 | Gillespie et al. |
| 6,078,315 | A | 6/2000 | Huang |
| 6,091,406 | A | 7/2000 | Kambara et al. |
| 6,188,391 | B1 | 2/2001 | Seely et al. |
| 6,225,985 | B1 | 5/2001 | Armstrong et al. |
| 6,229,529 | B1 | 5/2001 | Yano et al. |
| 6,310,610 | B1 | 10/2001 | Beaton et al. |
| 6,323,846 | B1 | 11/2001 | Westerman et al. |
| 6,327,011 | B2 | 12/2001 | Kim |
| 6,690,387 | B2 | 2/2004 | Zimmerman et al. |
| 6,856,259 | B1 | 2/2005 | Sharp |
| 7,015,894 | B2 | 3/2006 | Morohoshi |
| 7,079,118 | B2 | 7/2006 | Benard et al. |
| 7,098,891 | B1 | 8/2006 | Pryor |
| 7,184,064 | B2 | 2/2007 | Zimmerman et al. |
| 7,218,040 | B2 | 5/2007 | Toda |
| 7,489,308 | B2 | 2/2009 | Blake et al. |
| 7,499,039 | B2 | 3/2009 | Roberts |
| 7,573,466 | B1 | 8/2009 | Marzen et al. |
| 7,663,607 | B2 | 2/2010 | Hotelling et al. |
| 7,907,129 | B2 | 3/2011 | Idzik et al. |
| 8,131,026 | B2 | 3/2012 | Benkley et al. |
| 8,169,404 | B1 | 5/2012 | Boillot |
| 8,479,122 | B2 | 7/2013 | Hotelling et al. |
| 8,743,091 | B2 | 6/2014 | Bernstein |
| 8,963,890 | B2 | 2/2015 | Raif et al. |
| 9,557,833 | B2 | 1/2017 | Sundara-Rajan et al. |
| 10,126,877 | B1 | 11/2018 | Lynn et al. |
| 10,209,821 | B2 | 2/2019 | Roberts-Hoffman et al. |
| 10,969,873 | B2 | 4/2021 | Tan et al. |
| 11,287,917 | B2 | 3/2022 | Dahl et al. |
| 2001/0003452 | A1 | 6/2001 | Linge |
| 2004/0164970 | A1 | 8/2004 | Benard et al. |
| 2005/0017959 | A1 | 1/2005 | Kraus et al. |
| 2005/0052432 | A1 | 3/2005 | Kraus et al. |
| 2005/0083313 | A1 | 4/2005 | Hardie-Bick |
| 2005/0248548 | A1 | 11/2005 | Tsumura et al. |
| 2006/0026521 | A1 | 2/2006 | Hotelling et al. |
| 2006/0097991 | A1 | 5/2006 | Hotelling et al. |
| 2006/0197753 | A1 | 9/2006 | Hotelling |
| 2007/0211031 | A1 | 9/2007 | Marc |
| 2007/0240913 | A1 | 10/2007 | Schermerhorn |
| 2008/0059761 | A1 | 3/2008 | Norman |
| 2008/0100998 | A1* | 5/2008 | Sansom ................ G06F 1/1601 361/679.01 |
| 2008/0114251 | A1 | 5/2008 | Weymer et al. |
| 2008/0266266 | A1 | 10/2008 | Kent et al. |
| 2010/0020036 | A1 | 1/2010 | Hui et al. |
| 2010/0026667 | A1 | 2/2010 | Bernstein |
| 2011/0096036 | A1 | 4/2011 | McIntosh et al. |
| 2014/0267184 | A1 | 9/2014 | Bathiche et al. |
| 2016/0162048 | A1 | 6/2016 | David |
| 2018/0284946 | A1 | 10/2018 | Yousefpor et al. |
| 2021/0132787 | A1* | 5/2021 | Jung .................... G06F 1/1652 |
| 2021/0271338 | A1* | 9/2021 | Dahl ..................... G06F 3/043 |

FOREIGN PATENT DOCUMENTS

| | | |
|---|---|---|
| JP | 2002-342033 A | 11/2002 |
| WO | 2005/103872 A2 | 11/2005 |
| WO | 2005/103872 A3 | 4/2006 |

OTHER PUBLICATIONS

Final Office Action received for U.S. Appl. No. 12/184,232, mailed on Feb. 20, 2013, 25 pages.

Non-Final Office Action received for U.S. Appl. No. 12/184,232, mailed on Jul. 25, 2012, 19 pages.

Non-Final Office Action received for U.S. Appl. No. 12/184,232, mailed on Nov. 18, 2011, 22 pages.

Non-Final Office Action received for U.S. Appl. No. 15/923,967, mailed on Aug. 12, 2019, 7 pages.

Notice of Allowance received for U.S. Appl. No. 12/184,232, mailed on Mar. 14, 2014, 9 pages.

Notice of Allowance received for U.S. Appl. No. 15/923,967, mailed on Nov. 20, 2019, 8 pages.

Lee et al., "A Multi-Touch Three Dimensional Touch-Sensitive Tablet", CHI'85 Proceedings, Apr. 1985, pp. 21-25.

Rubine, Dean, "Combining Gestures and Direct Manipulation", CHI'92, May 3-7, 1992, pp. 659-660.

Rubine, Deanh., "The Automatic Recognition of Gestures", CMU-CS-91-202, Submitted in Partial Fulfillment of the Requirements for the Degree of Doctor of Philosophy in Computer Science at Carnegie Mellon University, Dec. 1991, 285 pages.

Westerman, Wayne, "Hand Tracking, Finger Identification, and Chordic Manipulation on a Multi-Touch Surface", A Dissertation Submitted to the Faculty of the University of Delaware in Partial Fulfillment of the Requirements for the Degree of Doctor of Philosophy in Electrical Engineering, 1999, 363 pages.

\* cited by examiner

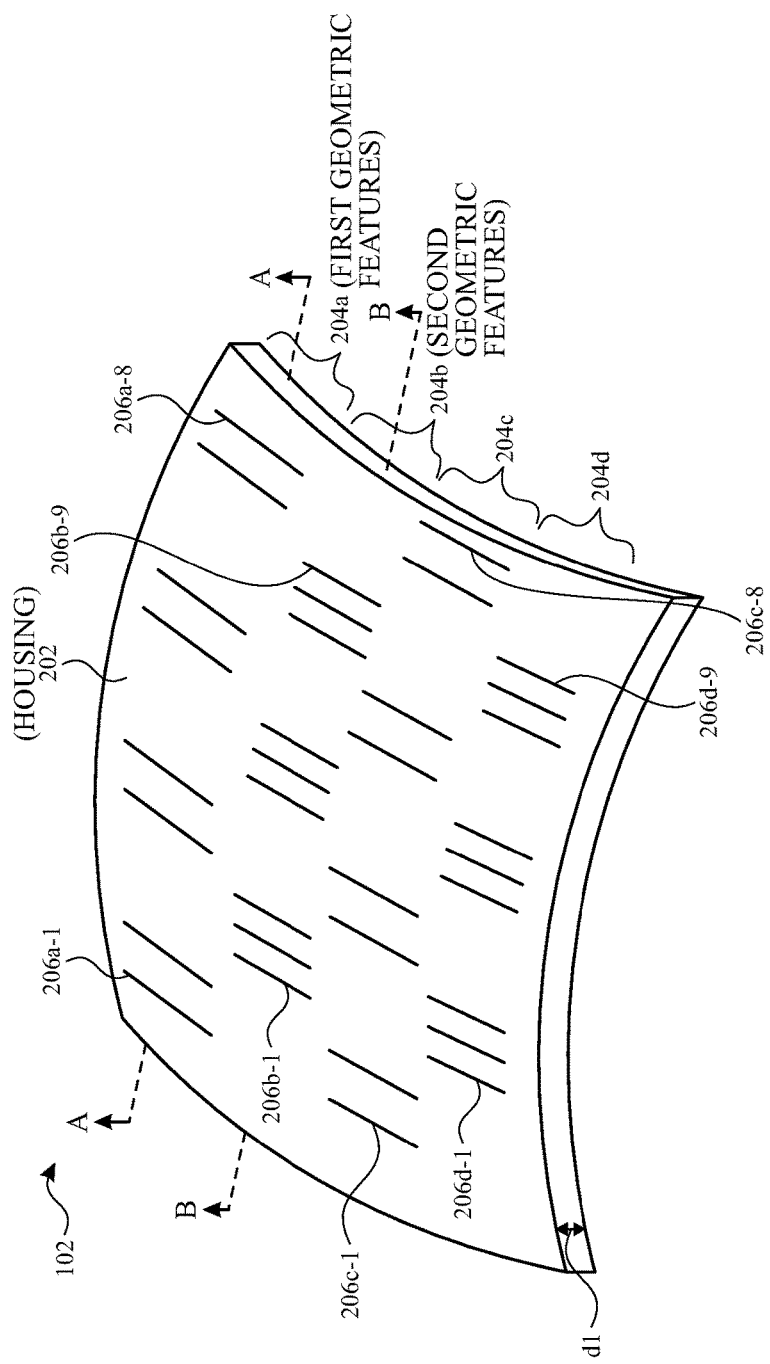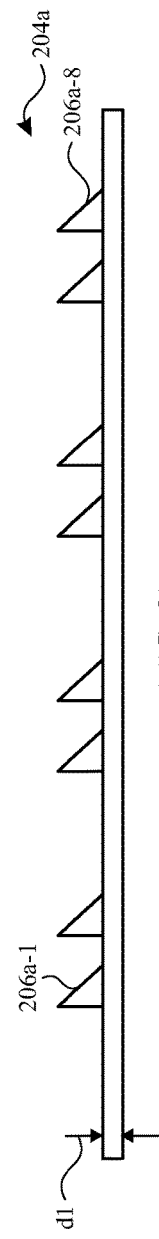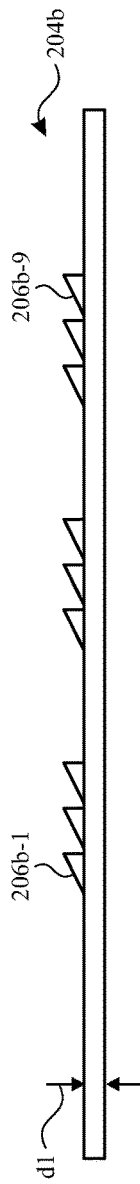
FIG. 2A
FIG. 2B
FIG. 2C

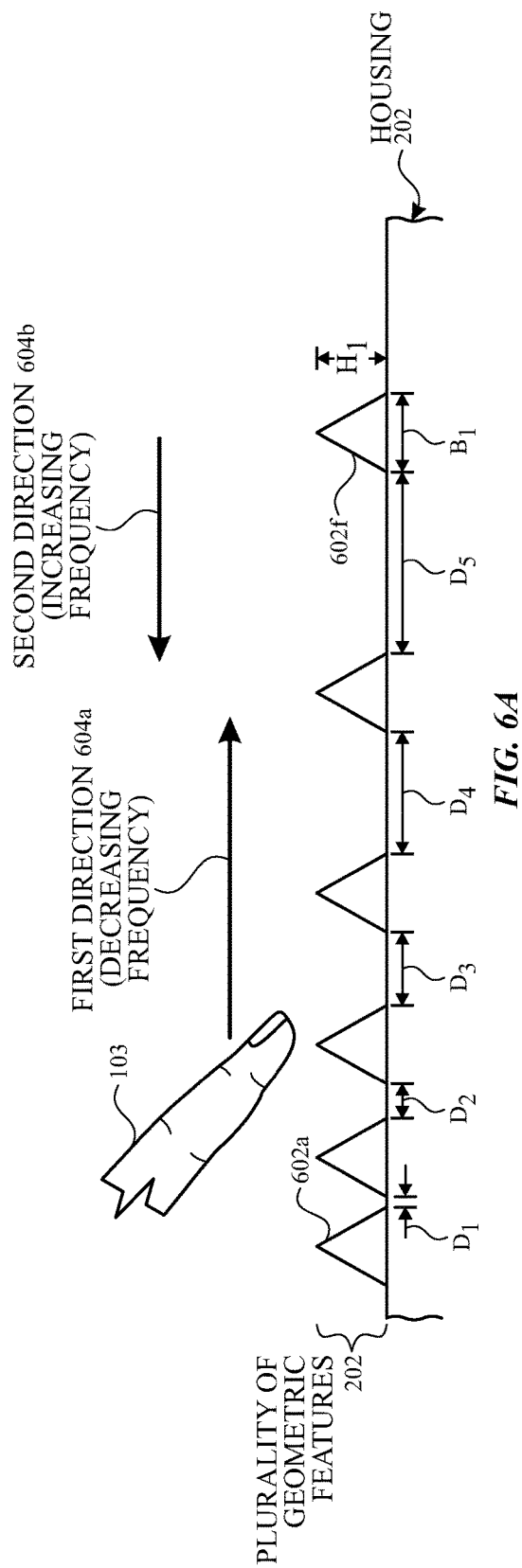
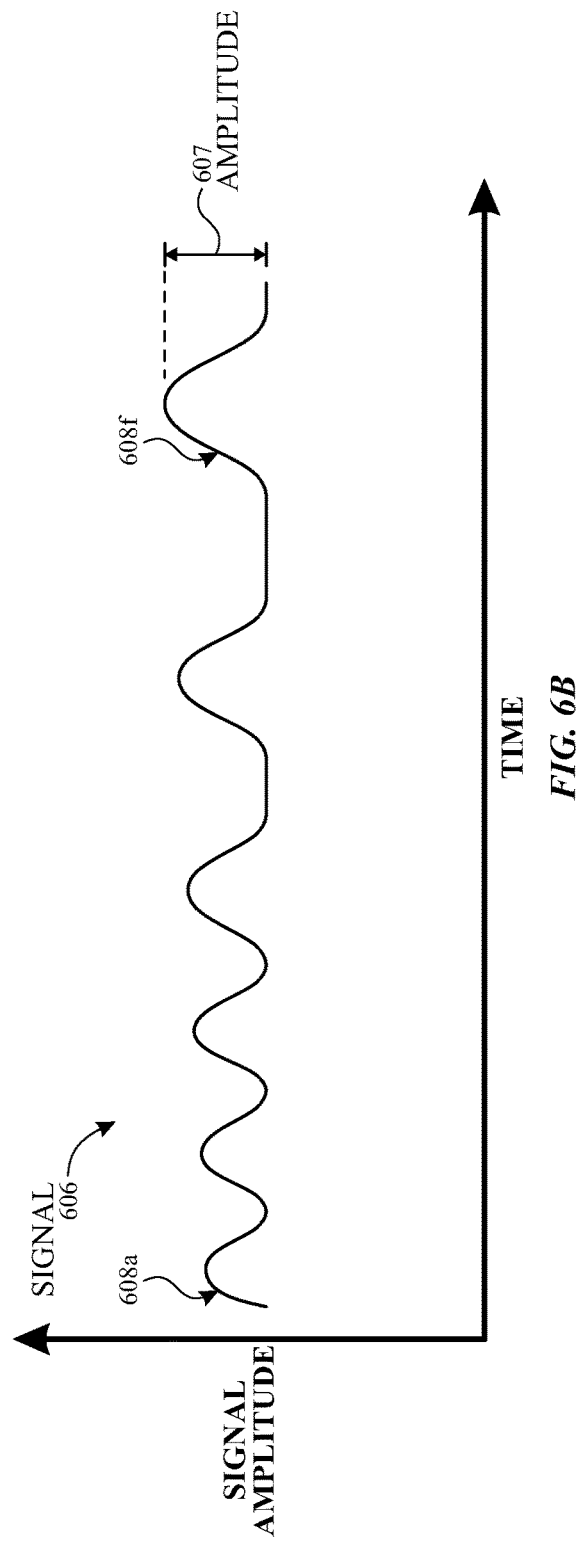
FIG. 6A
FIG. 6B

MULTI-DIRECTIONAL TEXTURE BASED INPUT DEVICE

CROSS-REFERENCE TO RELATED APPLICATIONS

This application claims the benefit of U.S. Provisional Application No. 63/376,991, filed Sep. 23, 2022, the content of which is herein incorporated by reference in its entirety for all purposes.

FIELD OF THE DISCLOSURE

This relates generally to electronic devices including a textured exterior surface for input, and more particularly to electronic devices including a textured exterior surface that is used for controlling functions associated with the electronic device or another electronic device when an object moves along the textured exterior surface.

BACKGROUND OF THE DISCLOSURE

Many types of input devices are presently available for performing operations in a computing system, such as buttons or keys, mice, trackballs, joysticks, touch sensor panels, touch screens, headphones, styluses, mobile phones, and the like.

SUMMARY OF THE DISCLOSURE

This relates generally to electronic devices including a textured exterior surface for input, and more particularity to electronic devices (e.g., ear buds, headphones, cellular phones, etc.) including a textured exterior surface that is used for controlling functions associated with the electronic device or another electronic device when an object moves along the textured exterior surface. In some examples, the textured exterior surface can be a multi-directional textured surface to enable multi-directional touch functionality. In some examples, an exterior surface of a housing of an electronic device includes a plurality of geometric features. When a finger (or an object such as a probe or stylus) contacts and moves along the plurality of geometric features of the exterior surface (e.g., a swipe gesture), sensors of the electronic device can detect signal inputs generated by vibrations (audible or inaudible) caused by the finger (or object) moving along the plurality of geometric features. In some examples, the multi-directional textured surface includes a first plurality of geometric features and a second plurality of geometric features. The signal inputs can be processed to determine the directionality of the movement input. In some examples, the processing can include determining whether the signal inputs satisfy one or more criteria, such as determining whether signal characteristics (e.g., pulse decay time characteristics, amplitude characteristics, frequency characteristics, etc.) of the signal inputs correspond to the characteristics of the first plurality of geometric features or the characteristics of the second plurality of geometric features. When the criteria are satisfied such that the signal inputs correspond to the characteristics of the first plurality of geometric features, a first direction in which the finger is moving can be determined (e.g., up-swipe direction). When the criteria are satisfied such that the signal inputs correspond to the characteristics of the second plurality of geometric features, a second direction in which the finger is moving can be determined (e.g., down-swipe direction). Determining the directionality of the finger can be used to generate a directional input for the electronic device to control a function associated with the electronic device (e.g., to adjust volume up or down for earbuds/headphones or for a cellular phone). The textured surface can thereby provide an input device for simplified and cost-effective integration into an electronic device to provide improved input modalities for improved user experience. In some examples, the textured surface can reduce the number of inputs/operations needed to control a feature of the electronic device for improved user experience.

BRIEF DESCRIPTION OF THE DRAWINGS

FIGS. 2A-2C illustrate views of an example exterior surface of an electronic device which includes a multi-directional textured pattern (e.g., geometric features) according to examples of the disclosure.

FIGS. 6A-6B illustrate an example of a finger of a user swiping along a plurality of geometric features and a plot of the detected signal input caused by the swiping motion according to examples of the disclosure.

DETAILED DESCRIPTION

Figure 1:
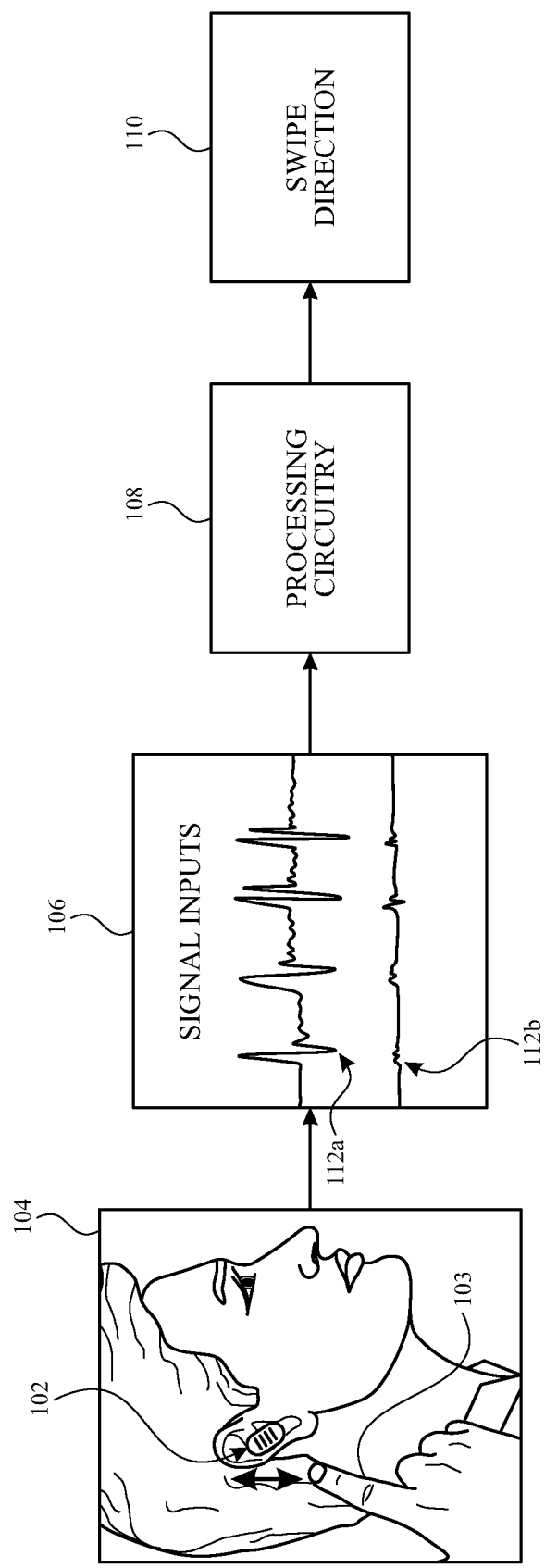
FIG. 1 illustrates a conceptual illustration of an example of a method for determining a swipe direction of an object according to examples of the disclosure.

In the following description of examples, reference is made to the accompanying drawings which form a part hereof, and in which it is shown by way of illustration specific examples that can be practiced. It is to be understood that other examples can be used and structural changes can be made without departing from the scope of the disclosed examples.

This relates generally to electronic devices including a textured exterior surface for input, and more particularity to electronic devices (e.g., ear buds, headphones, cellular phones, etc.) including a textured exterior surface that is used for controlling functions associated with the electronic device or another electronic device when an object moves along the textured exterior surface. In some examples, the textured exterior surface can be a multi-directional textured surface to enable multi-directional touch functionality. In some examples, an exterior surface of a housing of an electronic device includes a plurality of geometric features. When a finger (or an object such as a probe or stylus)

contacts and moves along the plurality of geometric features of the exterior surface (e.g., a swipe gesture), sensors of the electronic device can detect signal inputs generated by vibrations (audible or inaudible) caused by the finger (or object) moving along the plurality of geometric features. In some examples, the multi-directional textured surface includes a first plurality of geometric features and a second plurality of geometric features. The signal inputs can be processed to determine the directionality of the movement input. In some examples, the processing can include determining whether the signal inputs satisfy one or more criteria, such as determining whether signal characteristics (e.g., pulse decay time characteristics, amplitude characteristics, frequency characteristics, etc.) of the signal inputs correspond to the characteristics of the first plurality of geometric features or the characteristics of the second plurality of geometric features. When the criteria are satisfied such that the signal inputs correspond to the characteristics of the first plurality of geometric features, a first direction in which the finger is moving can be determined (e.g., up-swipe direction). When the criteria are satisfied such that the signal inputs correspond to the characteristics of the second plurality of geometric features, a second direction in which the finger is moving can be determined (e.g., down-swipe direction). Determining the directionality of the finger can be used to generate a directional input for the electronic device to control a function associated with the electronic device (e.g., to adjust volume up or down for earbuds/headphones or for a cellular phone). The textured surface can thereby provide an input device for simplified and cost-effective integration into an electronic device to provide improved input modalities for improved user experience. In some examples, the textured surface can reduce the number of inputs/operations needed to control a feature of the electronic device for improved user experience.

FIG. 1 illustrates a conceptual illustration of an example of a method for determining a swipe direction of an object according to examples of the disclosure. FIG. 1 shows a finger 103 contacting a patterned surface of an electronic device 102 and moving in a designated direction along the patterned surface at 104. In some examples, the swipe direction of the object can be determined using signal inputs generated by vibrations caused by the object moving along an exterior surface of an electronic device 102. In some examples, the method includes detecting signal inputs at 106 corresponding to vibrations generated by an object moving along an exterior surface of the electronic device 102. In some examples, the electronic device 102 includes a housing with a multi-directional textured pattern along a portion of the exterior surface. In some examples, the multi-directional textured pattern includes a plurality of geometric features that are arranged and distributed along the exterior surface in a various configurations and orientations (e.g., features variable in size, features uniform size, features spaced apart uniformly, variable shape of features, etc.).

In some examples, the electronic device 102 includes one or more sensors that are configured to detect signal inputs corresponding to vibrations caused by an object moving along the geometric features. In some examples, the one or more sensors include microphone(s), accelerometer(s), piezoelectric sensor(s), or any other sensors that can detect the vibrations within the local environment or of a surface of the electronic device. In some examples, the input object can include a finger 103 of a user, a stylus, a probe, or any other object can be used to swipe along the exterior surface of the electronic device 102. For example, as shown in operation 104, a finger 103 of a user can contact the exterior surface of the electronic device 102 and swipe along the exterior surface in a designated direction (e.g., upward direction, downward direction, leftward direction, rightward direction, circumferential direction, radial direction, etc.) to control a feature associated with the electronic device or another electronic device in communication with the electronic device. The movement of the finger 103 of the user along the geometric features of the exterior surface of the electronic device causes vibrations and signal inputs representing the vibrations are detected by the sensors.

In some examples, the detected signals (e.g., by the one or more sensors of the electronic device 102) can be processed using processing circuitry 108. In some examples, the processing can include distinguishing between the plurality of signals detected by the sensors and/or determining one or more characteristics associated with each of the signals. For example, as shown in the conceptual illustration of FIG. 1, the detected signals can include a first signal 112a and a second signal 112b detected by the sensors of the electronic device 102. The first signal 112a and the second signal 112b include various characteristics such as pulse decay time characteristics, amplitude characteristics, and frequency characteristics that are indicative of the different pluralities of geometric features. In some examples, the first signal 112a corresponds to a first plurality of geometric features on the exterior surface of the electronic device, and the second signal 112b corresponds to a second plurality of geometric features on the exterior surface of the electronic device (different than the first plurality of geometric features). For example, when a finger 103 swipes along the surface in an upward-direction, the detected first signal 112a and the detected second signal 112b are representative of the first plurality of geometric features and the second plurality of geometric features because the finger 103 can be concurrently in contact with both the first plurality of geometric features and the second plurality of geometric features when moving along the upward-direction. In some examples, each of the first plurality of geometric features and the second plurality of geometric features may include corresponding sensors that are embedded in the housing (e.g., interior surface or exterior surface) of the electronic device that are configured to detect the respective signals caused by an object moving along the respective geometric features.

In some examples, the processing of the signal inputs includes determining whether the detected signal inputs (e.g., first signal 112a, second signal 112b) satisfy one or more first criteria or one or more second criteria. In some examples, the one or more first criteria include a criterion that is satisfied when pulse decay time characteristics of the signal inputs generated by the object moving along a first direction correspond to the first characteristics of the first plurality of geometric features. For example, if the pulse decay time of the signal inputs correspond to the first characteristics of the first plurality of geometric features such as the size of the features (e.g., longer pulse decay time correlates with a larger feature size), it can be determined that the object is moving along the first direction (e.g., upward-direction). In some examples, the one or more second criteria include a criterion that is satisfied when pulse decay time characteristics of the signal inputs generated by the object moving along the second direction correspond to the second characteristics of the second plurality of geometric features. For example, if the pulse decay time of the signal inputs correspond to the feature size of the second plurality of geometric features, it can be determined that the object is moving along a second direction (e.g., downward-direction). In some examples, the one or more first criteria can include a criterion that is satisfied when the pulse decay time characteristics of the signal inputs is a above a predetermined threshold associated with the first plurality of geometric features. For example, if the pulse decay time of the signal inputs is above the predetermined threshold associated with the first plurality of geometric features, it can be determined that the object is moving along the first direction (e.g., upward-direction). In some examples, the one or more second criteria can include a criterion that is satisfied when the pulse decay time characteristics is above a predetermined threshold associated the second plurality of geometric features. For example, if the pulse decay time of the signal inputs is above the predetermined threshold associated the second plurality of geometric features, it can be determined that the object is moving along the second direction (e.g., downward-direction). In some examples, the processing at 108 includes applying one or more algorithms to process the signal inputs to evaluate various signal characteristics, such as pitch change, amplitude, pulse decay time, etc., corresponding to the plurality of geometric features.

In some examples, the method includes determining the swipe direction in accordance with the processing, and to use the determined swipe direction as an input for the electronic device. In some examples, the swipe direction can be used to adjust various control features associated with the electronic device such as adjusting the volume of the electronic device, controlling music playback on the electronic device, answer phone calls on the electronic device, skipping to a next or previous song that is being played on the electronic device, enabling noise cancellation, etc. In some examples, the swipe direction can be used as an input for a different electronic device in communication with the electronic device.

FIGS. 2A-2C illustrate views of an example exterior surface of an electronic device which includes a multi-directional textured pattern (e.g., geometric features) according to examples of the disclosure. As illustrated, a housing 202 of an electronic device 102 includes a multi-directional textured pattern distributed along the exterior surface of the electronic device. In some examples, the housing 202 can be made from plastic, glass, ceramic, metallic, or any suitable material that can be modified to include the multi-directional textured pattern along the exterior surface. In the example shown in FIG. 2A, housing 202 includes a non-planar surface (e.g., a curved surface) with a thickness d1. In other examples, the housing 202 can include a planar surface with a multi-directional textured pattern. In some examples, the housing 202 can be configured to have any other shape or size that can accommodate a multi-directional textured pattern along the exterior surface.

In the example illustrated in FIG. 2A, the multi-directional textured pattern on the exterior of the housing 202 of the electronic device 102 includes a plurality of geometric features 204a-204d that are distributed in multiple linear arrays. For example, the first plurality of geometric features 204a, the second plurality of geometric features 204b, the third plurality of geometric features 204c, and the fourth plurality of geometric features 204d are arranged and distributed linearly along the exterior surface. It is understood that more or fewer linear arrays can be implemented than shown in FIG. 2A. In some examples, as shown in FIG. 2A, each linear array of the plurality of geometric features are positioned adjacent to at least another linear array of the plurality of geometric features.

In some examples, each linear array of the plurality of geometric features 204a-204d may have corresponding characteristics defined by that shape, spacing, orientation, and configuration of the one or more features 206. For example, the first plurality of geometric features 204a includes a total of eight features 206a-1 to 206a-8 extending outward from the exterior surface of the housing 202. The second plurality of geometric features 204b includes a total of nine features 206b-1 to 206b-9 extending outward from the exterior surface of the housing 202. The third plurality of geometric features 204c includes a total of eight features 206c-1 to 206c-8 extending outward from the exterior surface of the housing 202. The fourth plurality of geometric features 204d includes a total of nine features 206d-1 to 206d-9 extending outward from the exterior surface of the housing 202. In some examples, the features 206 of the plurality of geometric features can be integrated (e.g., interleaved or otherwise intertwined) such that two adjacent linear arrays shown in FIG. 2A may be combined into a single linear array. For example, the features of the first plurality of geometric features 204a and the second plurality of geometric features 204b can be arranged in one linear array. In some examples, each linear array of the plurality of geometric features 204a-204d may have the same characteristics or different characteristics. In the illustrated example, the first plurality of geometric features 204a can have the same characteristics as the third plurality of geometric features 204c, and the second plurality of geometric features 204b can have the same characteristics as the fourth plurality of geometric features 204d. In this way, the use of two characteristics for the plurality of geometric features can enable generation of two different signals (e.g., due to vibrations) for bidirectional swipe detection as described herein.

FIG. 2B illustrates a cross-section view of the first plurality of geometric features 204a shown in FIG. 2A. As shown, view A-A illustrates features 206a-1 to 206a-8 of the first plurality of geometric features 204a extending outward from the exterior surface of the housing 202. The features 206a-1 to 206a-8 are triangular shaped (e.g., right triangle) where the base portion of the triangle is in contact with what would otherwise be the exterior surface of the housing (in the absence of features 206a-1 to 206a-8, and the altitude portion forms approximately a 90-degree angle with the exterior surface. It is understood that the triangular shape shown in FIG. 2B is a representative shape and that features 206a-1 to 206a-8 can be any shape or size. In some examples, the features 206a-1 to 206a-8 can be fabricated separately and attached to the exterior surface of the housing (e.g., using a pressure sensitive adhesive such as epoxy). The housing 202 of the electronic device 102 can be fabricated using various fabrication techniques (e.g., mold insertion, deposition, 3D printing, etc.) to create the features 206a-1 to 206a-8.

Referring to FIG. 2C illustrates, the figure illustrates a section view of the second plurality of geometric features 204b shown in FIG. 2A. As shown, view B-B illustrate features 206b-1 to 206b-9 of the second plurality of geometric features 204b extending outward from the exterior surface of the housing 202. The features 206b-1 to 206b-9 are triangular shaped (e.g., right angle triangle) where the base portion of the rectangle is in contact with what would otherwise be the exterior surface of the housing (in the absence of features 206b-1 to 206b-9), and the altitude portion forms approximately a 90-degree angle with the exterior surface. As noted above, it is understood that the triangular shape shown in FIG. 2C is a representative shape and that the features can be any shape or size and the features can be fabricated and attached to the exterior surface of the housing. Accordingly, the exterior surface of the housing 202 can be fabricated to include textured patterns such as bumps, ridges, etc. Additionally, it is understood that although the pattern is shown as including raised features (e.g., extending from what would otherwise be the exterior surface of the housing), that the patterned geometric features could additionally or alternatively include depressions, valleys, etc.

In some examples, each linear array of the plurality of geometric features 204a-204d includes a corresponding characteristic. In one example, the characteristic is coefficient of friction value that is based on the direction in which the object or finger of the user moves. The coefficient of friction is dimensionless value which measures the amount of friction between two surfaces (e.g., finger and exterior surface of the housing). The coefficient of friction is the ratio of a frictional force to a normal force and depends on the nature of the materials and surface roughness. In general, a low value of coefficient of friction indicates that the force required for sliding to occur is less than the force required when the coefficient of friction is high. Accordingly, rougher surfaces exhibit more friction than smooth surfaces because rougher surfaces generally have a larger coefficient of friction than smoother surfaces. Referring to FIG. 2B, the coefficient of friction is higher for a swipe direction from left to right than left to right because of the orientation of features 206a-1 to 206a-8. The features 206a-1 to 206a-8 are oriented such that a swipe from left to right has a greater resistance than compared to swiping from right to left and thus, the coefficient of friction from left to right has a greater coefficient of friction than from right to left. In another example, referring to FIG. 2C, the coefficient of friction is higher for a swipe direction from right to left than from left to right because of the orientation of features 206b-1 to 206b-9. The features 206b-1 to 206b-9 are oriented such that a swipe from right to left has a greater resistance than swiping from left to right. Accordingly, by configuring the features 206 of the plurality of geometric features 204a-204d to include characteristics that are unique based on its direction, signal inputs caused by vibrations when an object (or finger) moves along the features can be detected. In some examples, the geometric features 204a-204d can be oriented and distributed circumferentially for clockwise and counter-clockwise swipe directions, and/or radially for rotary swipe direction. For example, the plurality of geometric features can be distributed circumferentially along the exterior surface of a rod or a cylinder. In another example, the geometric features can be distributed radially in a circular pattern on a planar surface.

In some examples, one or more sensors (not shown in FIGS. 2A-2C) can be attached within the housing and/or to the exterior surface of the housing 202. The sensors can be configured to detect the signal inputs corresponding to vibrations generated by a finger swiping along the geometric features. In some examples, the sensors include one or more microphones, accelerometers, piezoelectric sensors, or any other sensors where vibration of the material or local environment generates an electrical signal. In one example, each geometric feature (or each linear array) of the plurality of geometric features 204a-204d can have a corresponding sensor that is attached on the opposite surface (e.g., interior surface of the geometric features and/or interior surface of the housing) of the respective geometric features and configured to detect signal inputs caused by the finger or object rubbing against the geometric features. For example, referring to FIG. 2A, when a finger of the user contacts the electronic device 102 along a leftmost portion of the housing 202 and swipes in a left to right motion, the finger of the user can be concurrently in contact with each linear array of the plurality of geometric features 204a-204d. Accordingly, because each of the plurality of geometric features 204a-204d can include a corresponding sensor (not shown) that is attached along the interior surface (e.g., opposite side of the linear arrays of geometric features 204a-204d), each of the sensors is configured to detect the respective signal caused by vibrations occurring along its respective geometric feature(s). In some examples, one or more sensors (not shown) can be attached to directly along the exterior surface of the housing 202 and adjacent to the plurality of geometric features 204a-204d. In the present example, each of the sensors are configured to detect the respective signal caused by vibrations occurring along the respective geometric feature.

Figure 3:
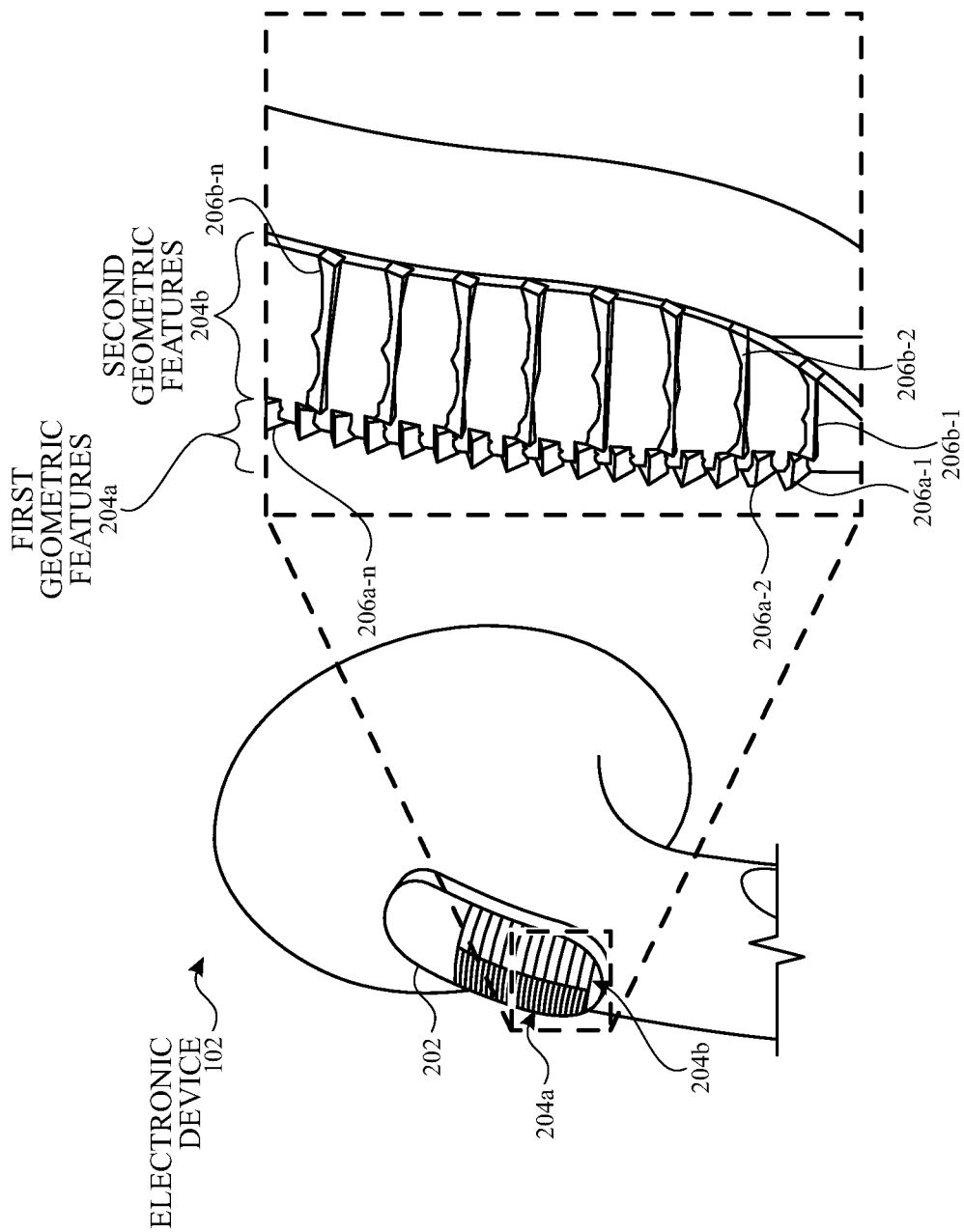
FIG. 3 illustrates an example of a wireless headphone which includes a first plurality of geometric features and a second plurality of geometric features along an exterior surface of the wireless headphone according to examples of the disclosure.

FIG. 3 illustrates an example of a wireless headphone (e.g., corresponding to electronic device 102) which includes a first plurality of geometric features 204a (e.g., a first linear array) and a second plurality of geometric features 204b (e.g., a second linear array) along an exterior surface of the wireless headphone according to examples of the disclosure. As noted above, a finger or an object contacting and swiping along the geometric features in a specific direction can result in an input signal detected by one or more sensors (not shown). The input signals can be processed to determine the swipe direction, which in turn can be used as an input to control various functions associated with the electronic device (or another device). In some examples, the functions can include controlling the volume, answering phone calls, pausing or playing a song, skipping to the next song or moving back to a previous song, muting or unmuting a song, activating noise cancellation, etc. Because the plurality of geometric features has unique patterns and characteristics, the signal inputs may be different based on the direction in which the plurality of geometric features are swiped. The signal inputs can be analyzed to determine if they correspond to the characteristics of the plurality of geometric features along a specific direction.

As illustrated in FIG. 3, the first plurality of geometric features 204a and a second plurality of geometric features 204b are attached to the housing 202 of the wireless headphone, though it is understood that in some examples, the housing of the electronic device can be fabricated to include the pattern of the first plurality of geometric features 204a and the second plurality of geometric features 204b. The first plurality of geometric features 204a includes first characteristics in which features 206a-1 to 206a-n are distributed uniformly along the housing. As further illustrated, the second plurality of geometric features 204b is adjacent to the first plurality of geometric features 204a. The second plurality of geometric features 204b includes second characteristics in which features 206b-1 to 206b-n are distributed uniformly along the housing. In some examples, features 206a-1 to 206a-n and features 206b-1 to 206b-n are interleaved with respect to each other. For example, as shown, feature 206a-1 and feature 206a-2 are interleaved between feature 206b-1 and 206b-2. Because the first plurality of geometric features 204a and a second plurality of geometric features 204b are adjacent to each other and their respective features are interleaved, an object or finger can concurrently contact the features when moving upward or downward along the plurality of features. In some examples, a portion of the first plurality of geometric features and a portion of the second plurality of geometric features can be interleaved together. In some examples, features 206a-1 to 206a-n and features 206b-1 to 206b-n can be positioned side-by-side with each other where at least one side of the second plurality of geometric features 206b is adjacent to a side of the first plurality of features 206a (e.g., such that an object such as a finger still contacts both the first and second plurality of features when moving along the exterior surface).

Figure 4A:
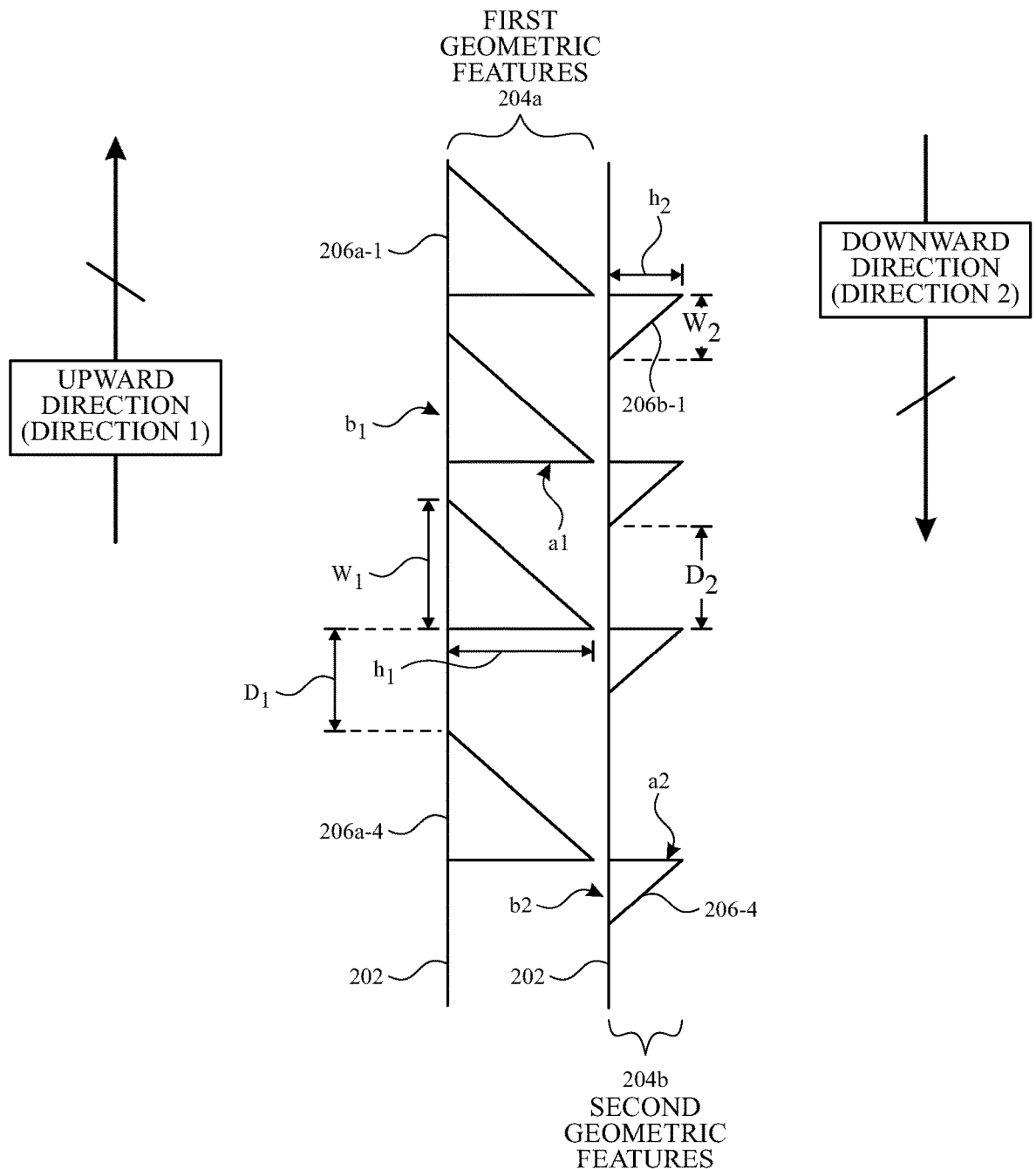
FIGS. 4A-4C illustrate an example of a plurality of geometric features and corresponding plots of the detected signal inputs caused by a swiping motion in two directions along the plurality of geometric features according to examples of the disclosure.
Figure 4B:
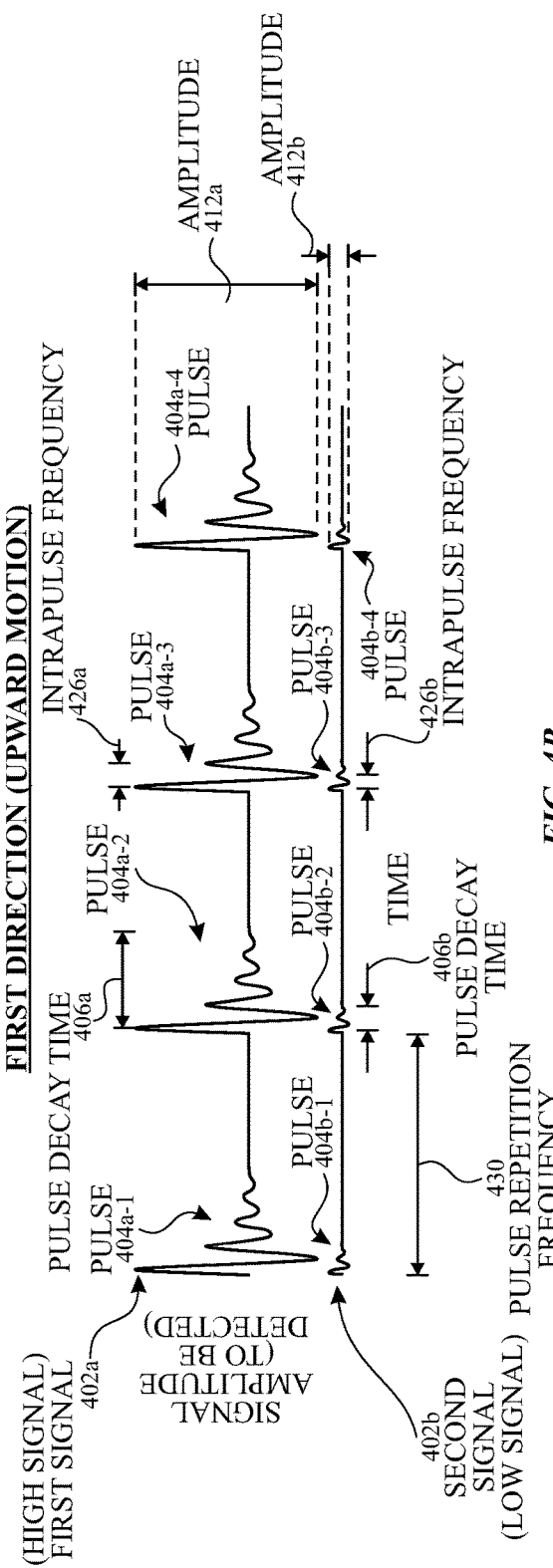
Figure 4C:
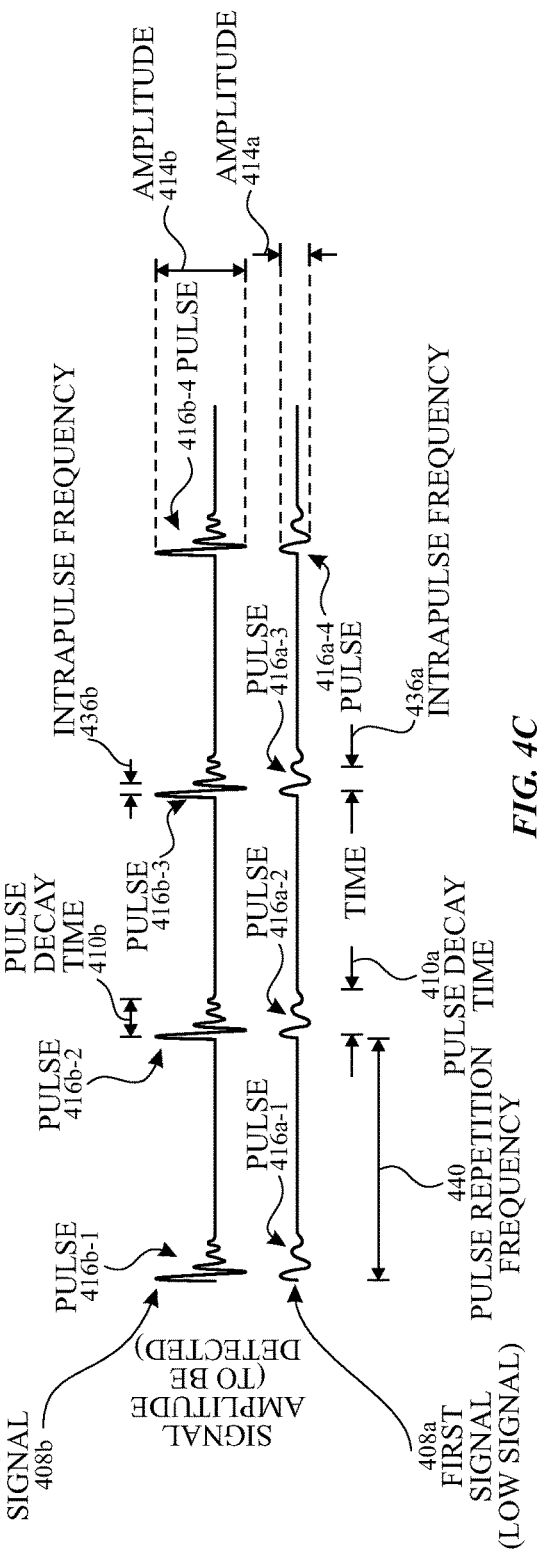

FIGS. 4A-4C illustrate an example of a plurality of geometric features and corresponding plots of the detected signal inputs caused by a swiping motion in two directions along the plurality of geometric features according to examples of the disclosure. FIG. 4A illustrates an example of a multi-directional textured surface along an exterior surface of an electronic device 102. In particular, the exterior surface of housing 202 is patterned with a first plurality of geometric features 204a with first characteristics and a second plurality of geometric features 204b with second characteristics different from the first characteristics. The first plurality of geometric features 204a includes triangle shaped features 206a-1 to 206a-4 that extend outward from an exterior surface of the electronic device. The triangular shape of each of the features 206a-1 to 206a-4 is represented by a base portion b1 (or width w1 along housing 202) and an altitude portion a1 (height h1 from the housing 202). In some examples, the base portion b1 of the triangle is in contact with the exterior surface and the altitude portion forms a 90-degree angle (e.g., within a threshold tolerance, such as within 5 degrees, 10 degrees, etc.) with the exterior surface. In some examples, the features 206a-1 to 206a-4 can be configured to be any other shape, and the dimensions and the spacing between each of the features can be configured to be uniform, different, and any distance. As further illustrated, the second plurality of geometric features 204b includes triangle shaped features 206b-1 to 206b-4 that extend outward from an exterior surface of the electronic device. The triangular shape of each of the features 206b-1 to 206b-4 is represented by a base portion b2 (or width w2 along housing 202) and an altitude portion a2 (height h2 from the housing 202). In the illustrated example, the base portion b2 of the triangle is in contact with the exterior surface and the altitude portion a2 forms a 90-degree angle (e.g., within a threshold tolerance, such as within 5 degrees, 10 degrees, etc.) with the exterior surface. In some examples, the features 206b-1 to 206b-4 can be configured to be any other shape, and the dimensions and the spacing between each of the features can be configured to be uniform, different, and any distance.

As shown in FIG. 4A, the respective features of the first plurality of geometric features 204a and a second plurality of geometric features 204b are arranged such that the hypotenuse of features 206b-1 to 206b-4 are mirrored across an axis normal to the housing 202 with respect to features 206a-1 to 206a-4. For example, the hypotenuse features 206a-1 to 206a-4 is rotated 90 degrees with respect to the hypotenuse of features 206b-1 to 206b-4. This is one example that enables the first plurality of geometric features 204a and the second plurality of geometric features 204b to have respective first characteristics and second characteristics that are direction-specific because a swiping motion along a first direction (e.g., upward motion) will have different characteristics compared to a swiping motion along a second direction (e.g., downward motion). In some examples, the first plurality of geometric features 204a and the second plurality of geometric features 204b can have characteristics that are based on the size of the features, shape of the features, orientation and spacing of the features, and friction associated with the features, etc.

For example, the first plurality of geometric features 204a and the second plurality of geometric features 204b can include characteristics such as a coefficient of friction that is direction specific. Referring to features 206a-1 to 206a-4 of the first plurality of geometric features 204a in FIG. 4A, when a finger (or object) of a user touches the features and swipes in an upward direction, the coefficient of friction is greater compared to the downward direction because the surface roughness is greater along the upward direction. For example, in the upward direction the finger encounters the altitude of the feature, whereas in the downward direction the finger encounters the base and gradually achieve altitude along the rise of the hypotenuse. Accordingly, the amount of force (e.g., applied force) to swipe in the upward direction is greater than the amount of force to swipe in the downward direction. In some examples, referring to the second plurality of geometric features 204b in FIG. 4A, when a finger (or object) of a user touches the 206b-1 to 206b-4 and swipes in a downward direction, the coefficient of friction is greater compared to the upward direction because the surface roughness is greater along the downward direction. Accordingly, the amount of force (e.g., applied force) to swipe in the downward direction is greater than the amount of force to swipe in the upward direction. In some examples, the orientation, size, and shape of the features 206 can affect the coefficient of friction. For example, if height h1 (e.g., altitude portion a1) of features 206a-1 to 206a-4 is reduced to be smaller, the roughness is also reduced which in turn reduces the coefficient of friction in the upward direction. Conversely, in another example, if height h1 (e.g., altitude portion a1) of features 206a-1 to 206a-4 is increased to be larger, the roughness is also increased which in turn increases the coefficient of friction in the upward direction.

FIG. 4B illustrates a plot of the input signals generated by vibrations caused by an object moving in a first direction along the first plurality of geometric features 204a and the second plurality of geometric features 204b of FIG. 4A according to examples of the disclosure. As illustrated, a plot of signal amplitude versus time is shown for a first signal 402a which corresponds to features 206a-1 to 206a-4 of the first plurality of geometric features 204a and a second signal 402b which corresponds to features 206b-1 to 206b-4 of the second plurality of geometric features 204b. In some examples, when a finger (or object) rubs against features 206a-1 to 206a-4 and features 206b-1 to 206b-4, and moves in a first direction (e.g., upward direction), one or more sensors are configured to detect the first signal 402a and the second signal 402b. In some examples, the first signal 402a and the second signal 402b can be detected by a single sensor and the sensor and/or downstream processing can be configured to separate and distinguish the characteristics of first signal 402a and the second signal 402b.

As illustrated in FIG. 4B, the plot shows the first signal 402a and the second signal 402b over a time period with various signal characteristics that correspond to the characteristics of the plurality of geometric features 204. In some examples, the signals illustrated in the plot can include characteristics such as pulse decay time characteristics, amplitude characteristics, and pulse repetition frequency characteristics, and intra-pulse frequency characteristics. For example, referring to the first signal 402a and the second signal 402b in the plot, the first signal 402a corresponds to features 206a-1 to 206a-4 and the second signal 402b corresponds to features 206b-1 to 206b-4 of FIG. 4A in which vibrations generated by moving an object along the first direction produces the first signal 402a and the second signal 402b. In the example, the first signal 402a and the second signal 402b respectively include signal characteristics such as pulse decay time 406a and 406b, pulse repetition frequency 430, intra-pulse frequency characteristic 426a and 426b, and amplitude 412a and amplitude 412b. The first signal 402a includes pulse 404a-1 to 404a-4 and each pulse corresponds to each feature 206a-1 to 206a-4 of FIG. 4A. The second signal 402b includes pulse 404b-1 to 404b-4 and each pulse corresponds to each of the features 206b-1 to 206b-4 of FIG. 4A.

In some examples, the pulse decay time 406a and 406b is the time taken for the amplitude 412a and 412b of a pulse to decrease from a its peak value (or specified value such as 90% of the peak) to a minimum or baseline value (e.g., such as 10% of the maximum value, 5% of the maximum value or zero). In some examples, the pulse decay time 406a and 406b depends on the size and orientation of the features 206, and the swipe direction along the features. For example, as shown in FIG. 4B, for a swipe motion along the first direction (e.g., upward direction), the pulse decay time 406a of the first signal 402a is longer than the pulse decay time 406b of the second signal 402b because the features of 206a-1 to 206a-4 are larger than features 206b-1 to 206b-4 (e.g., h1 is greater than h2 in FIG. 4A). In some examples, the pulse decay time 406a of the first signal 402a is longer than the pulse decay time 406b of the second signal 402b because the orientation of features of 206a relative to the exterior surface causes a greater resistance (e.g., larger coefficient of friction) along an upward swipe direction. For example, referring to FIG. 4A, the orientation of features of 206a-1 to 206a-4 are positioned such that the finger swiping upward first encounters the full altitude of the feature (descending the hypotenuse of features 206a-1 to 206a-4), whereas the orientation of features 204b-1 to 204b-4 are positioned such that the finger swiping upward last encounters the full altitude of the feature (ascending the hypotenuse of features 206b-a to 206b-4). In an upward swipe motion, the orientation of features of 206a-1 to 206a-4 is a factor that contributes to the pulse decay time 406a of the first signal 402a being greater than it would be if the hypotenuse were rotated 90 degrees. Accordingly, the pulse decay time 406a of the first signal 402a is longer than the pulse decay time 406b of the second signal 402b because the size of features 206a-1 to 206a-4 are larger than features 206b-1 to 206b-4 and because the resistance (e.g., coefficient of friction) of the features 206a-1 to 206a-4 along the first direction (e.g., upward direction) is greater than the resistance of features 206b-1 to 206b-4.

In some examples, the pulse repetition frequency is the number of pulses of a repeating signal in a specific time period. For example, as illustrated in FIG. 4B, the pulse repetition frequency 430 of the first signal 402a is the same as the pulse repetition frequency of the second signal 402b. Pulse repetition frequency 430 is represented in FIG. 4B as a separation in time between the start of adjacent pulses in the first signal 402a (e.g., between pulses 404a-1 and 404a-2) and the separation in time between the start of adjacent pulses in the second signal 402b (e.g., between pulses 404b-1 and 404b-2). In some examples, the pulse repetition frequency depends on speed of the swipe, where a faster swipe correlates with a larger pulse repetition frequency. Although the pulse repetition frequency is shown to be the same for the first signal 402a and the second signal 402b, it is understood that the pulse repetition frequency may be different (e.g., when the feature spacing is different for features 206a-1 to 206a-4 compared with features 206b-1 to 206b-4, or when the speed of the swipe changes).

In some examples, the intra-pulse frequency characteristic is a characteristic that indicates the frequency of the decaying sinusoidal wave within each of the respective pulses (e.g., pulses 404a-1 to 404a-4, pulses 404b-1 to 404b-4). For example, as illustrated in FIG. 4B, intra-pulse frequency characteristic 426a represents the intra-pulse frequency characteristic for the first signal 402a (e.g., represented by the time between adjacent sinusoidal peaks in pulse 404a-3) and intra-pulse frequency characteristic 426b represents the intra-pulse frequency characteristic for the second signal 402b (e.g., represented by the time between adjacent sinusoidal peaks in pulse 404b-3). For example, because the size of the features 206a-1 to 206a-4 are greater than the size of the features 206b-1 to 206b-4 associated with the second signal 402b, the frequency characteristic within each pulse is inversely related to the size of the features. Thus, the first signal 402a results in a smaller frequency characteristic within each pulse than the second signal 402b for a given time period.

In some examples, the signal characteristics of the first signal 402a and the second signal 402b can include amplitude 412a and amplitude 412b, respectively. As illustrated, amplitude 412a of the first signal 402a is the peak-to-peak amplitude which is the change between the peak (e.g., highest amplitude value) and the trough (e.g., lowest amplitude value). As further shown, amplitude 414b of the second signal 402b is the peak-to-peak amplitude which is the change between the peak and the trough. The amplitude of the first signal 402a and the second signal 402b corresponds to the size of the features and the intensity of the vibrations caused by an object moving along the geometric features. For example, referring to FIG. 4A, when an object moves along the first plurality of geometric features 204a (e.g., features 206a-1 to 206a-4) and the second plurality of geometric features 204b (e.g., features 206b-1 to 206b-4) in an upward direction, the intensity along the first plurality of geometric features 204a is greater than the intensity along the second plurality of geometric features 204b because the features are larger and because the friction along the first plurality of geometric features 204a is greater than the friction along the second plurality of geometric features 204b. Accordingly, because the size of the features and the friction along the first plurality of geometric features 204a is greater than the size of the features and friction along the second plurality of geometric features 204b, the amplitude 412a of the first signal 402a is greater than the amplitude 412b of the second signal 402b.

FIG. 4C illustrates a plot of the input signals generated by vibrations caused by an object moving in a second direction (e.g., downward direction) along the first plurality of geometric features 204a and the second plurality of geometric features 204b of in FIG. 4A according to examples of the disclosure. As illustrated, a plot of signal amplitude versus time is shown for a first signal 408a which corresponds to features 206a-1 to 206a-4 of the first plurality of geometric features 204a and a second signal 408b which corresponds to features 206b-1 to 206b-4 of the second plurality of geometric features 204b. In some examples, when a finger (or an object) contacts features 206a-1 to 206a-4 and features 206b-1 to 206b-4, and moves in a second direction (e.g., downward direction), one or more sensors are configured to detect the first signal 408a and the second signal 408b.

As shown in FIG. 4C, the plot illustrates the first signal 408a and the second signal 408b over a time period with various signal characteristics that correspond to the characteristics of the plurality of geometric features 204a and 204b of FIG. 4A. As noted above, the signals in the plot can include signal characteristics such as pulse decay time characteristics, amplitude characteristics, pulse repetition frequency characteristics, and intra-pulse frequency characteristics. For example, first signal 408a corresponds to features 206a-1 to 206a-4 and the second signal 408b corresponds to features 206b-1 to 206b-4 of FIG. 4A in which vibrations are produced an object moves along the second direction (e.g., downward direction). In the illustrated example, the first signal 408a and the second signal 408b respectively include signal characteristics such as pulse decay time 410a and 410b, intra-pulse frequency characteristics 436 and 436b (represented in time), and amplitude 414a and amplitude 414b. The first and second signals also have shared characteristic of a pulse repetition frequency 440. The first signal 408a includes pulse 416a-1 to 4416a-4 and each pulse corresponds to each feature of features 206a-1 to 206a-4 of FIG. 4A. The second signal 408b includes pulse 416b-1 to 416b-4 and each pulse corresponds to each of the features 206b-1 to 206b-4 of FIG. 4A.

In some examples, the pulse decay time 410a and 410b is the time taken for the amplitude of a pulse to decrease from a its peak value to a minimum or baseline value. In some examples, the pulse decay time 410a and 410b depends on the size and orientation of the features 206, and the swipe direction of an object along the features. For example, as shown in FIG. 4C, for a swipe motion along the second direction (e.g., downward direction), the pulse decay time 410a of the first signal 408a is longer than the pulse decay time 410b of the second signal 408b because the features of 206a-1 to 206-4 are larger than features 206b-1 to 206b-4 (e.g., h1 is greater than h2 in FIG. 4A). In some examples, the pulse decay time 410a of the first signal 408a is shorter than the pulse decay time 406a of the first signal 402a illustrated in FIG. 4B because the orientation of features of 206a relative to the exterior surface causes less resistance (e.g., lower coefficient of friction) along a downward swipe direction. For a downward swipe motion, the orientation of features 206a-1 to 206a-4 is a factor that contributes to the resulting pulse decay time 410a of the first signal 408a being shorter than the pulse decay time 406a of the first signal 402a because the finger swiping downward last encounters the full altitude of the features (ascending the hypotenuse of features 206a-1 to 206a-4), whereas the orientation of features 206a-1 to 206a-4 for a finger swiping upward first encounters the full altitude of the feature (descending the hypotenuse of features 206a-1 to 206a-4).

As noted above, the pulse repetition frequency is the number of pulses of a repeating signal in a specific time period. For example, as illustrated in FIG. 4C, the pulse repetition frequency 440 of the first signal 408a is the same as the pulse repetition frequency 440 of the second signal 408b. Pulse repetition frequency 440 is represented in FIG. 4C as a separation in time between the start of adjacent pulses in the first signal 408a (e.g., between pulses 4016a-1 and 416a-2) and the separation in time between the start of adjacent pulses in the second signal 408b (e.g., between pulses 416b-1 and 416b-2). In some examples, the pulse repetition frequency depends on speed of the swipe, with a faster swipe correlating with a larger pulse repetition frequency. Although the pulse repetition frequency is shown to be the same for the first signal 408a and the second signal 408b, it is understood that the pulse repetition frequency may be different (e.g., when the feature spacing is different for features 206a-1 to 206a-4 compared with features 206b-1 to 206b-4, or when the speed of the swipe changes).

In some examples the intra-pulse frequency characteristic is the frequency of the decaying sinusoidal wave within each pulse. For example, as illustrated in FIG. 4C, intra-pulse frequency characteristic 436b represents the intra-pulse frequency characteristic for the second signal 408b and intra-pulse frequency characteristic 436a represents the intra-pulse frequency characteristic for the first signal 408a. In some examples, the intra-pulse frequency characteristic depends on the size of the features 206. For example, because the size of the features 206a-1 to 206a-4 associated with the first signal 408a are greater than the size of the features 206b-1 to 206b-4 associated with the second signal 408b, the characteristic frequency within each pulse is inversely related to the size of the features. As a result, the first signal 408a results in a smaller characteristic frequency within each pulse than the second signal 408b for a given time period.

In some examples, the signal characteristics of the first signal 408a and the second signal 408b can include amplitude 414a and amplitude 414b, respectively. In some examples, the amplitude of the first signal 408a and the second signal 408b corresponds to the size of the features and orientation of the features. For example, referring to FIG. 4A, for a downward swipe motion, friction along the first plurality of geometric features 204a is less than the friction along the second plurality of geometric features 204b because the features 206b-1 to 206b-3 are arranged in a way such that the finger swiping downward first encounters the altitude portion of the features 206b-1 to 206b-3. Accordingly, because the friction along the second plurality of geometric features 204b is greater than the friction along the first plurality of geometric features 204a, the amplitude 414b of the second signal 408b is greater than the amplitude 414a of the first signal 408a.

One or more of the various signal characteristics (intra-pulse frequency, pulse decay time, amplitude, pulse repetition frequency) can be used to determine swipe characteristics (e.g. direction and/or speed). In some examples, pulse repetition frequency is particularly useful for determining swipe speed.

Figure 5:
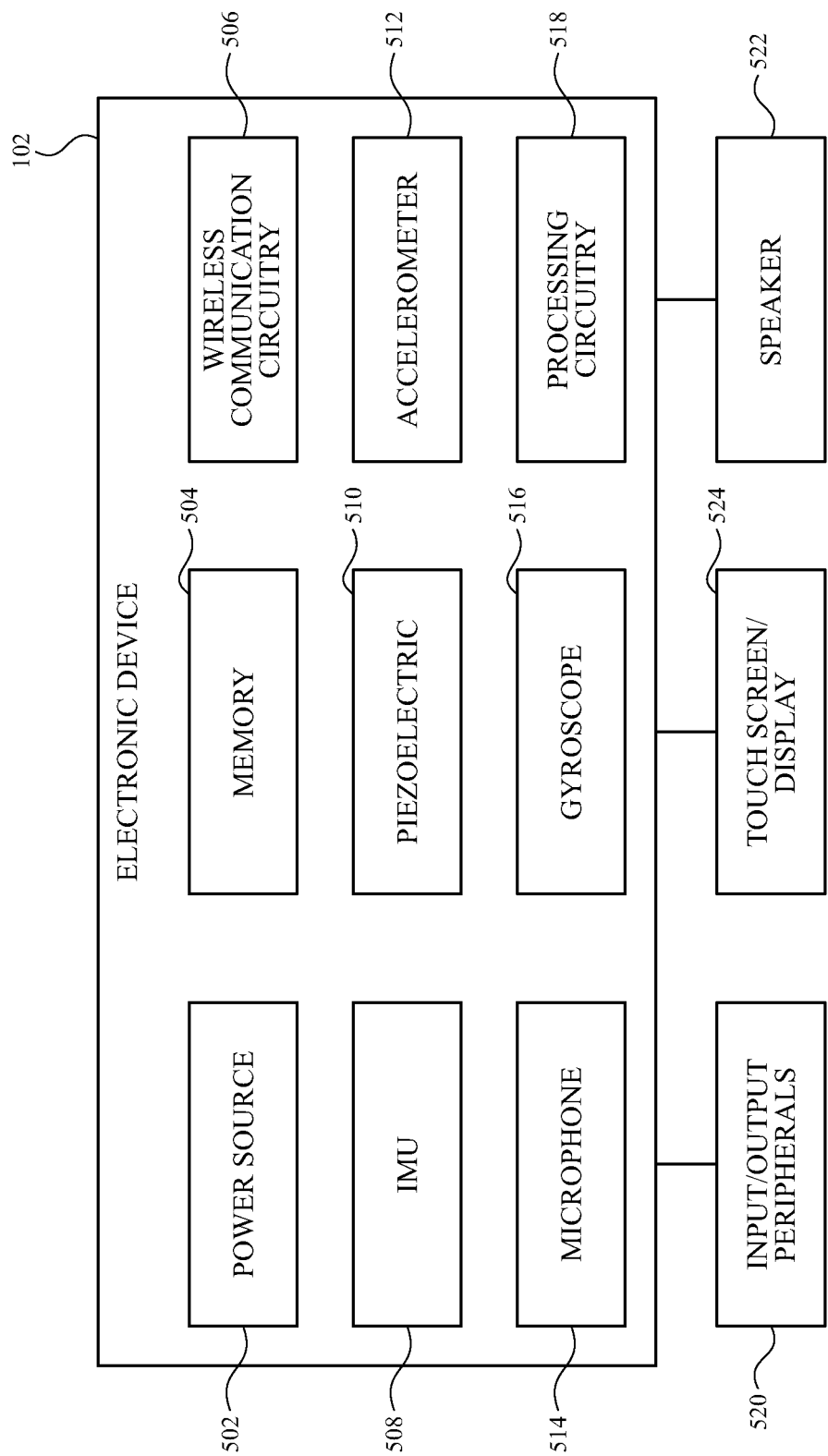
FIG. 5 is a block diagram illustrating an electronic device according to examples of the disclosure.

FIG. 5 is a block diagram illustrating an electronic device 102 according to examples of the disclosure. In some examples, the electronic device 102 includes a textured surface as described herein. The electronic device can be, for example, one or more ear buds, headphones, cellular phones, laptops, desktop computers, tablets, keyboards, styluses, etc. In some examples, the electronic device 102 can include a power source 502 (e.g., battery), memory 504, wireless communication circuitry 506, inertial measurement unit (IMU) 508, piezoelectric sensor 510, accelerometer 512, microphone 514, gyroscope 516, and processing circuitry 518. It is understood that the electronic device 102 can have a subset of these components or additional components (e.g., touch screen, track pad, display, proximity sensors, other sensors for sensing vibrations, etc.).

In some examples, power source 502 can be implemented with any device capable of providing energy to the electronic device. For example, power source 502 can include one or more batteries or rechargeable batteries. Additionally or alternatively, power source 502 can include a power connector or power cord that connects the electronic device to another power source, such as a wall outlet to charge the rechargeable battery of the electronic device. In some examples, memory 504 can include any type of memory. By way of example only, memory 504 can include random access memory, read-only memory, Flash memory, removable memory, other types of storage elements, or combinations of such memory types.

In some examples, wireless communication circuitry 506 can transmit data to or receive data from another electronic device, such as from buttons or keys, mice, trackballs, joysticks, touch sensor panels, touch screens, headphones, styluses, mobile phones, computing systems, etc. In some examples, the input to the textured surface can be detected at electronic device 102 and the transmitted data can include controls for another electronic device in accordance with the input (e.g., the input to the textured surface can control the volume of another device or toggle a state of another device). Although wireless communication circuitry 506 is illustrated and described, it is understood that other wired communication interfaces may be used. In some examples, the wireless and/or wired communications interfaces can include, but are not limited to, cellular, Bluetooth, and/or Wi-Fi communications interfaces. In some examples, IMU 508 is configured to detect motion and/or orientation of the electronic device 102. In some examples, a specific orientation of the electronic device 102 and/or a pattern of movement of the electronic device 102 can be determined, which can be indicative of a user walking/moving while using the electronic device.

In some examples, piezoelectric sensor 510 is configured to detect an amount of force applied to the electronic device. In some examples, piezoelectric sensor 510 is configured to detect force above a threshold or below the threshold. In some examples, piezoelectric sensor 510 can be disposed along an interior surface of the housing of the electronic device (opposite of the side of the housing on which the geometric features are formed). In some examples, as described herein, the piezoelectric sensor 510 can be used to detect input from an object sliding across the plurality of geometric features. In some examples, piezoelectric sensor 510 can be disposed in other regions along the housing of the electronic device such as the exterior surface of the electronic device. In some examples, accelerometer 512 is configured to measure linear acceleration of the electronic device. In some examples, when a finger or object is in contact with the electronic device, the accelerometer 512 can determine determining speed (magnitude), velocity (magnitude and direction), and/or an acceleration (a change in magnitude and/or direction) of the point of contact. In some examples, microphone(s) 514 is configured to detect signal inputs generated by vibrations caused by an object moving along the geometric features. In some examples, microphone(s) 514 is configured to detect sound waves and convert the sound waves to electrical signals (e.g., or more generally acoustic or ultrasonic energy). In some examples, gyroscope 516 is configured to determine the change in orientation of the electronic device. In some examples, gyroscope 516 and accelerometer 512, in combination, can determine the change in position and/or orientation of the electronic device in a three-dimensional space. In some examples, gyroscope 516 can determine an angular velocity of the electronic device.

In some examples, processing circuitry 108 can communicate, either directly or indirectly, with some or all of the other components of electronic device 102. For example, a system bus or other communication mechanism can provide communication between the various components of electronic device 102 (e.g., using one or more buses). As noted above, processing circuitry 108 can be configured to process the signal inputs detected by sensors to determine the directionality of the movement input on the textured surface (e.g., due to vibrations). In some examples, processing circuitry 108 can include determining whether the signal inputs satisfy one or more criteria, such as determining whether signal characteristics (e.g., pulse decay time characteristics, amplitude characteristics, frequency characteristics, etc.) of the signal inputs correspond to the characteristics of the first plurality of geometric features or the characteristics of the second plurality of geometric features. When the criteria are satisfied, the direction in which the finger is moving can be determined (e.g., up-swipe direction, down-swipe direction, etc.). Determining the directionality of the finger can be used to generate a directional input for the electronic device to control a function associated with the electronic device (e.g., to adjust volume up or down for earbuds/headphones or for a cellular phone).

In some examples, the electronic device 102 can communicate with touch screen 524 via over one or more communication buses or signal lines. In some examples, touch screen 524 can be configured to display content generated using the electronic device 102 (e.g., viewing media contents streamed by a cellular device). In some examples, touch screen 524 provides an input interface and an output interface between the electronic device and a user. Touch screen 524 is configured to receive and/or send electrical signals from/to the electronic device 102. Touch screen 524 displays visual output to the user. The visual output optionally includes graphics, text, icons, video, and any combination thereof (collectively termed "graphics"). In some examples, some or all of the visual output optionally corresponds to user-interface objects.

In some examples, the electronic device 102 is coupled to input/output (I/O) peripherals 520 which include physical buttons (e.g., push buttons, rocker buttons, etc.), dials, slider switches, joysticks, click wheels, and so forth. The I/O peripherals 520 receive/send electrical signals from/to the electronic device 102. In some examples, the electronic device 102 is coupled to speaker 522 and is configured to provide an audio interface between a user and the electronic device 102. In some examples, audio circuitry receives audio data and converts the audio data to an electrical signal, and transmits the electrical signal to speaker 522. Speaker 522 converts the electrical signal to human-audible sound waves.

Note that one or more of the functions described in this disclosure (e.g., the detection of directionality of a sliding/swiping input on a surface including a plurality of geometric features) can be performed by firmware stored in memory (e.g., memory 504) and executed by one or more processors (e.g., processing circuitry 518). The firmware can also be stored and/or transported within any non-transitory computer-readable storage medium for use by or in connection with an instruction execution system, apparatus, or device, such as a computer-based system, processor-containing system, or other system that can fetch the instructions from the instruction execution system, apparatus, or device and execute the instructions. In the context of this document, a "non-transitory computer-readable storage medium" can be any medium (excluding signals) that can contain or store the program for use by or in connection with the instruction execution system, apparatus, or device. In some examples, memory 504 can be a non-transitory computer readable storage medium. Memory 504 can have stored therein instructions, which when executed by processing circuitry 518, can cause electronic device 102 to perform one or more functions and methods of one or more examples of this disclosure.

FIGS. 2A-4A illustrate a multi-directional textured surface with a first plurality of geometric features and a second plurality of geometric features. Additionally, FIGS. 2A-4A generally show the first plurality of features with uniform altitude features and uniform spacing between features, as well as the second plurality of features with uniform altitude features and uniform spacing between features. It is understood, however, that the disclosure described herein is not so limited. For example, the textured surface may not include multiple pluralities or geometric features, and the features may have non-uniform spacing and/or non-uniform amplitudes (for each plurality of geometric features). FIGS. 6A-6B illustrate an example of a finger 103 of a user swiping along a plurality of geometric features 204 and a plot of the detected signal input caused by the swiping motion according to examples of the disclosure. The example illustrated in FIGS. 6A-6B is an example (e.g., frequency-based example) of a textured surface that includes one plurality of geometric features. As shown in FIG. 6A, the plurality of geometric features 204 includes a first characteristics where the frequency of features 602a-602f decreases from left to right as the spacing between features increases (e.g., frequency-based example). Each of the features 602a-602f are triangular shaped and extends outward from the exterior surface of the housing 202 of an electronic device. In other examples, features 602a-602f can be any shape, size, and can be distributed along the exterior surface in any type of configuration (e.g., uniformly). In some examples, the features 602a-602f can be attached to the exterior surface of the housing or the pattern of the features 602a-602f can be fabricated (e.g., deposition, 3D printing) directly onto the exterior surface of the housing to create the pattern. As further illustrated, each of the features 602a-602f are defined by a height H1 and base width B1. In some examples, the dimensions of the features 602a-602f can be the same or can vary for each of the features 602a-602f. In the illustrated example, the spacing D1-D5 for the features increase from left to right. For example, the spacing D1 (e.g., between feature 602a and 602b) is less than spacing D5 (e.g., between feature 602e and 602f). When the user swipes in a first direction 604a (left to right), the frequency of the features decrease. Conversely, when the user swipes in a second direction 604b (right to left), the frequency of the features increase. By adjusting the frequency or periodicity of the features along a swipe direction, the corresponding signal caused by the swipe motion results in a signal having a decrease or increase in pitch based on the swipe direction as illustrated in FIG. 6B.

FIG. 6B illustrates a plot of the signal 606 generated by vibrations caused by the finger 103 of the user moving along a first direction 604a (e.g., left to right) along the plurality of geometric features 204 in FIG. 6A. As illustrated, a plot of signal amplitude versus time is shown for signal 606 that corresponds to the finger of the user moving along features 602a-602f of the plurality of geometric features 204. In some examples, referring to FIG. 6A, when a finger 103 of the user (or object) contacts the features 602a-602f of the plurality of geometric features 204 and moves along first direction 604a (or second direction 604b), one or more sensors are configured to detect signal 606 which is displayed in the plot in FIG. 6B. As illustrated, the plot shows the signal 606 over a time period with various signal characteristics that correspond to the characteristics of the features 602a-602f. The signal 606 includes pulse 608a-608f and each pulse corresponds to each of the features 602a-602f FIG. 6A. In some examples, the signal characteristics in the plot can include amplitude characteristics and frequency characteristics. For example, as shown in the plot, the frequency of signal 606 decreases over a period of time which corresponds to the corresponding decrease in features 602a-602f of the plurality of geometric features 204 (e.g., spacing increases) along the first direction 604a (e.g., left to right). As further illustrated, the signal 606 can include amplitude 607. The amplitude 607 of the signal 606 is the change between the peak (e.g., highest amplitude value) and the trough (e.g., lowest amplitude value). The amplitude 607 of the signal 606 corresponds to the size of features 602a-602f. Because the size of each of the features 602a-602f are the same (e.g., height H1 and base width B1), when the finger 103 of the user moves along the features 602a-602f, this causes the amplitude 607 to be uniform at the respective pulses 608a-608n of the signal 606.

Figure 6C:
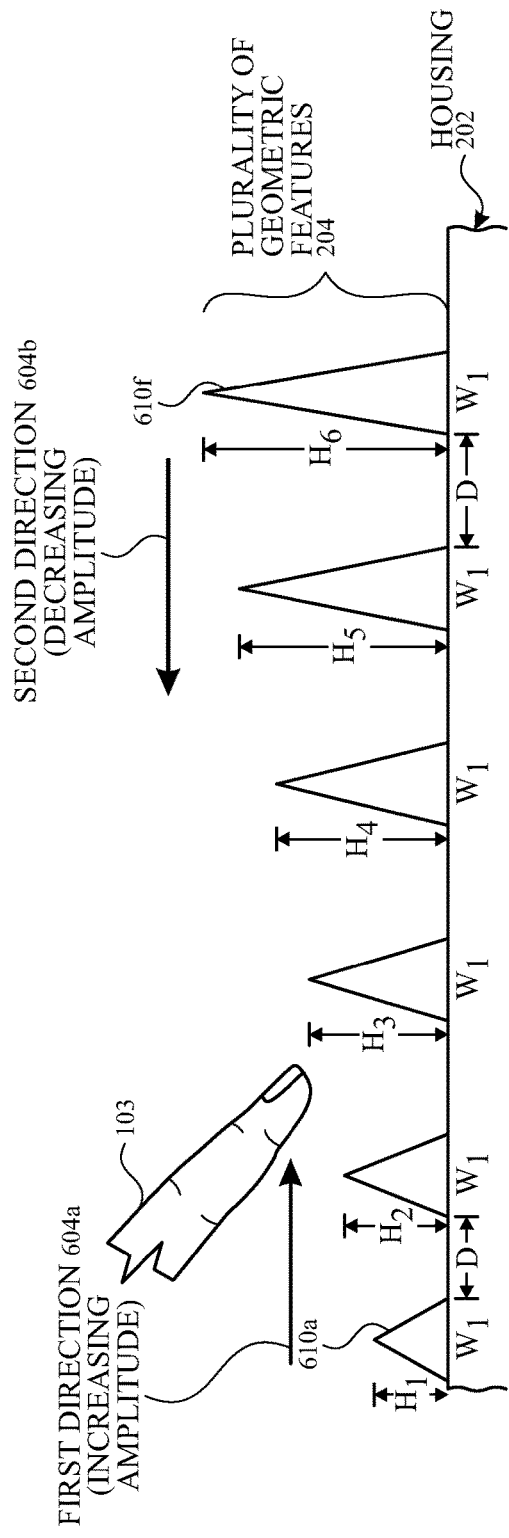
FIGS. 6C-6D illustrate another example of a finger of a user swiping along the plurality of geometric features and a plot of the detected signal caused by the swiping motion according to examples of the disclosure.
Figure 6D:
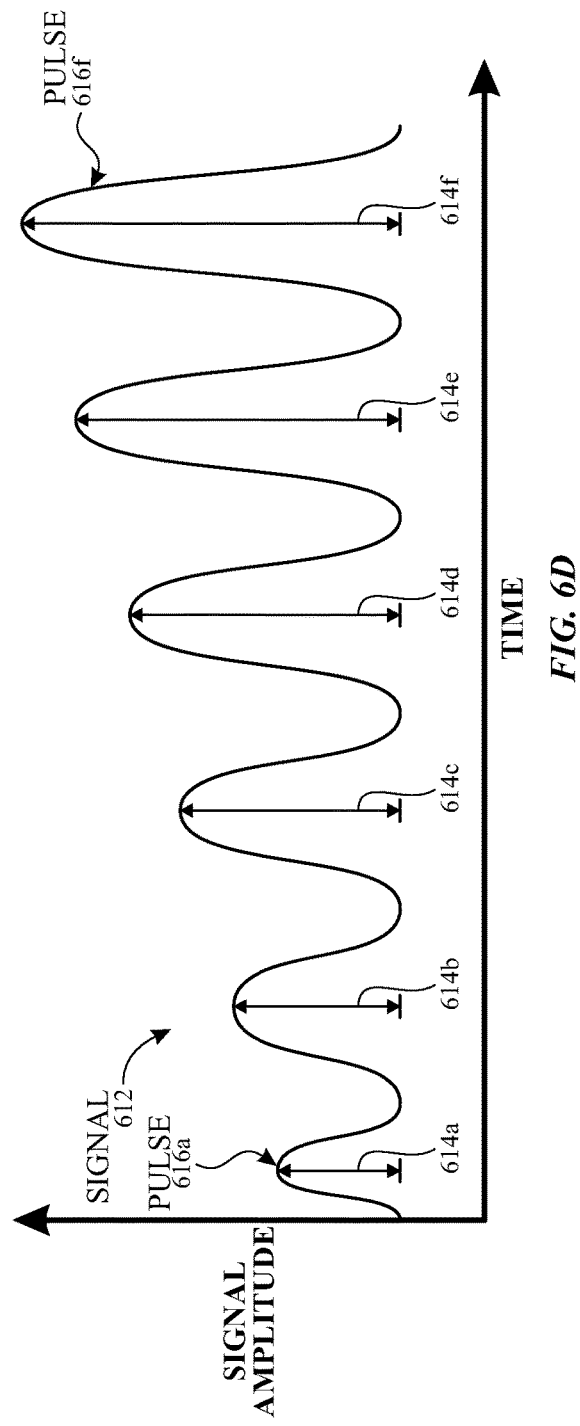

FIGS. 6C-6D illustrate another example of a finger 103 of a user swiping along the plurality of geometric features and a plot of the detected signal caused by the swiping motion according to examples of the disclosure. The example illustrated in FIGS. 6C-6D is another example (e.g., amplitude-based example) of a textured surface that includes one plurality of geometric features. As shown in FIG. 6C, the plurality of geometric features 204 includes a first characteristics where the height H1-H6 of features 610a-610f increases from left to right (e.g., amplitude-based example). Each of the features 610a-610f are triangular shaped and extends outward from the exterior surface of the housing 202 of an electronic device. In other examples, features 610a-610f can be any shape, size, and can be distributed along the exterior surface in any type of configuration. In some examples, the features 610a-610f can be attached to the exterior surface of the housing or the pattern of the features 610a-610f can be fabricated directly onto the exterior surface of the housing to create the textured pattern. As further illustrated, each of the features 610a-610f are respectively defined by height H1-H6 and width W1. In the illustrated example, the respective height H1-H6 of each of the features 610a-610f increases from left to right and the distance D between each of the features 610a-610f are the same. For example, height H6 of feature 610f is larger than height H1 of feature 610a and the distance to an adjacent feature are the same (e.g., uniform separation distance D). When the user swipes in a first direction 604a (left to right), the intensity and resistance increase which in turn results in the amplitude of the corresponding signal illustrated in FIG. 6D increasing over a time period. By adjusting the by height H1-H6 of the features 610a-610f along the first direction 604a, the corresponding signal caused by the swipe motion results in a signal having an increase in the amplitude that is reflective of the increase in height of the feature along the first direction 604a.

FIG. 6D illustrates a plot of the signal generated by vibrations caused by the finger 103 of the user moving along a first direction 604a (e.g., left to right) along features 610a-610f in FIG. 6C. As illustrated, a plot of signal amplitude versus time is shown for signal 612. In some examples, referring to FIG. 6C, when a finger 103 (or object) contacts and rubs against the features 610a-610f and moves along the first direction 604a (or second direction 604b), one or more sensors are configured to detect signal 612 which is displayed in the plot in FIG. 6D. As illustrated, the plot shows the signal 612 over a time period with various signal characteristics that correspond to the characteristics of the features 610a-610f. The signal 612 includes pulse 616a-616f and each pulse corresponds to each of the features 610a-610f of FIG. 6C. In some examples, the signal characteristics in the plot can include amplitude characteristics. For example, the amplitude 614a-614f of signal 612 increases over a period at the respective pulse 616a-616f, which corresponds to the increase in amplitude of features 610a-610f. In some examples, the amplitude 614a-614f of the signal 612 corresponds to the size of features 610a-610f. For example, the larger the height H1-H6 of the features 610a-610f are, the larger the amplitude will be. Because the size of each of the features 610a-610f increases along the first direction 604a, when the finger 103 of the user moves along the features 610a-610f, this causes the amplitude 614a-614f to increase at the respective pulses 616a-616f of signal 616.

It is understood that although FIG. 6A shows a unidirectional change in spacing/frequency (e.g., increasing or decreasing depending on the direction of movement) and FIG. 6C shows a unidirectional change in height/amplitude (e.g., increasing or decreasing depending on the direction of movement), that the disclosure is not so limited. For example, the change in spacing/frequency and/or amplitude can change in different ways, and the pattern of the changes can be indicative of the direction of movement and or provide location information regarding in addition to directional information. Additionally, although FIGS. 6A and 6B separately illustrate changing the amplitude or frequency of features, it is understood that the amplitude and frequency can both be varied for a plurality of features (e.g., increase amplitude of features and decrease spacing of features along a particular movement direction).

Figure 7:
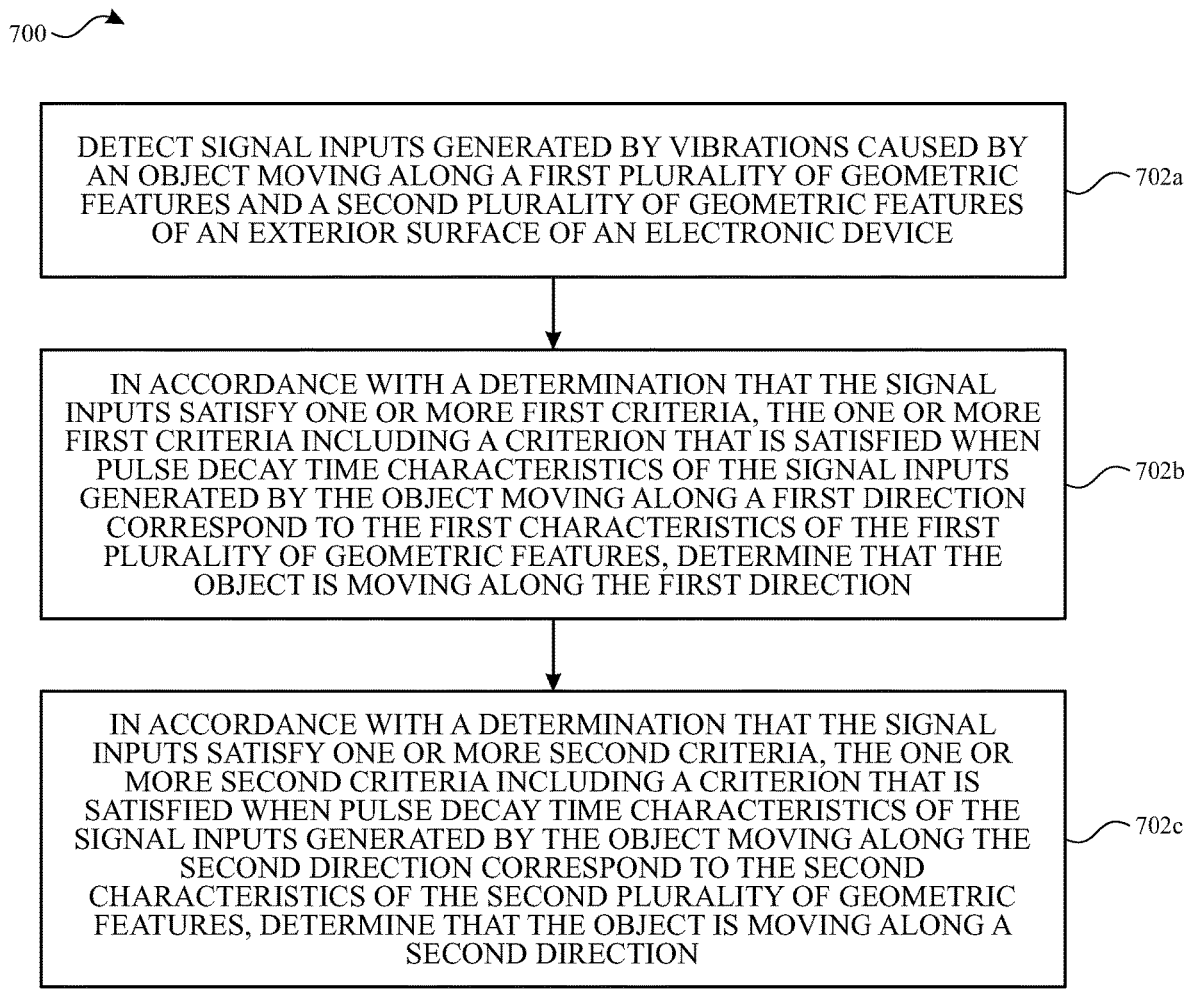
FIG. 7 is a flow diagram illustrating a method in which an electronic device determines the direction in which an object is moving based on signal inputs generated by vibrations caused by the object moving along an exterior surface of the electronic device according to examples of the disclosure.

FIG. 7 is a flow diagram illustrating a method in which an electronic device determines the direction in which an object is moving based on signal inputs generated by vibrations caused by the object moving along an exterior surface of the electronic device according to examples of the disclosure. Based on the swipe direction of the object, the swipe direction can be used as an input for the electronic device to adjust a function associated with the electronic device such as adjusting the volume and controlling media playback. The method 700 can be performed at electronic device 102 as described above with reference to FIGS. 1-6D, though, the method 700 can be performed by any other suitable device.

As describe below, the method 700 provides ways in which electronic devices can process signal inputs generated by an object such as a finger of a user moving along the plurality of geometric features. By processing the signal inputs and using one or more criteria to determine if the signal characteristics correspond to the characteristics of the plurality of geometric features along a specific swipe direction, the swipe direction can be determined and in turn can be used to control a function associated with the electronic device. The textured surface can reduce the number of inputs/operations needed to control a feature of the electronic device for improved user experience.

In some examples, method 700 is performed at an electronic device (e.g., 102). In some examples, the electronic device 102 can be one or more earbuds or headphones, a mobile phone, a remote control, a stylus, etc. where their respective exterior surface is patterned with a first plurality of geometric features with first characteristics and a second plurality of geometric features with second characteristics, different from the first characteristics.

In some examples, the electronic device detects (702a), via one or more sensors of the electronic device, signal inputs generated by vibrations caused by an object moving along a first plurality of geometric features and a second plurality of geometric features of an exterior surface of an electronic device, such as the first and second plurality of geometric features and respective signals in FIGS. 4A-4C. For example, one or more sensors can be attached to an interior surface of the exterior surface of the electronic device and the detected signals (e.g., first signal 402a, second signal 402b) are displayed in the plot in FIG. 4B.

In some examples, the electronic device is configured to process, via processing circuitry of the electronic device. In accordance with a determination that the signal inputs satisfy one or more first criteria, the one or more first criteria including a criterion that is satisfied when pulse decay time characteristics of the signal inputs generated by the object moving along a first direction correspond to the first characteristics of the first plurality of geometric features, the processing circuitry is configured to determine (702b) that the object is moving along the first direction. For example, referring to FIG. 4A and FIG. 4B, when an object (e.g., finger) contacts the first plurality of geometric features 204a and the second plurality of geometric features 204b, and swipes in an upward direction (e.g., first direction), the first signal 402a and the second signal 402b can be detected and the respective signals are displayed in the plot of FIG. 4B. The first signal 402a represents the vibration generated from the first plurality of geometric features 204a and the second signal 402b represents the vibration generated from the second plurality of geometric features 204b of FIG. 4A. In some examples, to determine whether the object is moving along the first direction, the processing circuitry can correlate the pulse decay time characteristics of the first signal 402a and the second signal 402b with the respective characteristics of the first plurality of geometric features 204a or the second plurality of geometric features 204b. The correlation can be used as a criterion for determining whether the object is moving along the first direction. In some examples, the electronic device can implement algorithms that can determine whether the correlation criterion is met. Referring to FIG. 4B, the pulse decay time 406a of the first signal 402a is longer than the pulse decay time 406b of the second signal 402b. This corresponds to the characteristics of the first plurality of geometric features 204a and second geometric features 204b along the first direction (e.g., upward direction) because the size of features 206a-1 to 206a-4 are larger than features 206b-1 to 206b-4 which causes the longer pulse decay time. Accordingly, when the correlation between the pulse decay time for the signals is above a threshold, the processing circuitry can determine that the object is moving along the first direction (e.g., upward direction)

In some examples, the electronic device is configured to process, via processing circuitry of the electronic device. In accordance with a determination that the signal inputs satisfy one or more second criteria, the one or more second criteria including a criterion that is satisfied when pulse decay time characteristics of the signal inputs generated by the object moving along the second direction correspond to the second characteristics of the second plurality of geometric features, the processing circuitry is configured to determine (702c) that the object is moving along a second direction. For example, referring to FIG. 4A and FIG. 4C, when an object (e.g., finger) contacts the first plurality of geometric features 204a and a second plurality of geometric features 204b and swipes in a downward direction (e.g., second direction), the first signal 408a and the second signal 408b can be detected and the respective signals are displayed in the plot of FIG. 4C. In some examples, to determine whether the object is moving along the second direction, the processing circuitry can correlate the pulse decay time characteristics of the first signal 408a and the second signal 408b with the respective characteristics of the first plurality of geometric features 204a or the second plurality of geometric features 204*b*. The correlation can be used as a criterion for determining whether the object is moving along the second direction. Referring to FIG. 4C, the pulse decay time 410*a* of the first signal 408*a* is longer than the pulse decay time 410*b* of the second signal 408*b*. This corresponds to the characteristics of the first plurality of geometric features 204*a* and second geometric features 204*b* along the second direction (e.g., downward direction) because the size of features 206*a*-1 to 206*a*-4 are larger than features 206*b*-1 to 206*b*-4 which causes the longer pulse decay time. Accordingly, when the correlation between the pulse decay time for the signals is above a threshold, the processing circuitry can determine that the object is moving along the second direction (e.g., downward direction).

Although primarily described herein in terms of bidirectional swiping using linear arrays of geometric features (e.g., swipe up/down or swipe left-right), it is understood that the disclosure herein is not limited to such implementations. In some examples, the geometric features can be oriented and distributed in non-linear arrays. For example, the geometric features can be implemented in a circle on a planar surface to enable bidirectional circumferential swiping (e.g., clockwise and counter-clockwise swipe directions). In some examples, the linear array(s) of geometric features can be implemented on a non-linear surface. For example, one or more linear array(s) of geometric features can be implemented radially (e.g., around a circumferential of a cylinder) to enable rotational swipe directions (e.g., clockwise or counter-clockwise around the radial surface. Additionally or alternatively, in some examples, features with distinguishable signal characteristics can be distributed along the two-dimensional surface of the sensitive region of a device to enable swiping in four or more directions. For example, a first plurality of geometric features and a second plurality of geometric features can be used to determine swiping along a first axis and a third plurality of geometric features and a fourth plurality of geometric features can be used to determine swiping along a second axis. In some examples, the first axis and the second axis are orthogonal. As a result, the two-dimensional pattern can enable both left and right swipes and up and down swipes. Additionally, the two-dimensional pattern can enable off-axis swipes (e.g., diagonal) or non-linear motion. In some examples, the two-dimensional pattern can include geometric features both circumferentially and axially on a rod or a cylinder to enable circumferential and/or axial swipe inputs.

Therefore, according to the above, some examples of the disclosure are directed to an electronic device. The electronic device can comprise: a housing including an exterior surface patterned with a first plurality of geometric features with first characteristics and a second plurality of geometric features with second characteristics different from the first characteristics; one or more sensors configured to detect signal inputs generated by vibrations caused by an object contacting and moving along the first plurality of geometric features and the second plurality of geometric features of the exterior surface; and processing circuitry configured to: in accordance with a determination that the detected signal inputs satisfy one or more first criteria, the one or more first criteria including a criterion that is satisfied when pulse decay time characteristics of the detected signal inputs generated by the object moving along a first direction correspond to the first characteristics of the first plurality of geometric features, determine that the object is moving along the first direction; and in accordance with a determination that the detected signal inputs satisfy one or more second criteria, the one or more second criteria including a criterion that is satisfied when pulse decay time characteristics of the detected signal inputs generated by the object moving along the second direction correspond to the second characteristics of the second plurality of geometric features, determine that the object is moving along a second direction. Additionally or alternatively to one or more of the examples disclosed above, in some examples, the one or more first criteria further include a criterion that is satisfied when amplitude characteristics of the detected signal inputs correspond to the first characteristics of the first plurality of geometric features. Additionally or alternatively to one or more of the examples disclosed above, in some examples, the one or more second criteria further include a criterion that is satisfied when amplitude characteristics of the detected signal inputs correspond to the second characteristics of the second plurality of geometric features. Additionally or alternatively to one or more of the examples disclosed above, in some examples, the one or more first criteria further include a criterion that is satisfied when pulse frequency characteristics of the detected signal inputs correspond to the first characteristics of the first plurality of geometric features. Additionally or alternatively to one or more of the examples disclosed above, in some examples, the one or more second criteria further include a criterion that is satisfied when pulse frequency characteristics of the detected signal inputs correspond to the second characteristics of the second plurality of geometric features. Additionally or alternatively to one or more of the examples disclosed above, in some examples, characteristics of the first plurality of geometric features along the first direction is different than characteristics of the first plurality of geometric features along the second direction. Additionally or alternatively to one or more of the examples disclosed above, in some examples, characteristics of the second plurality of geometric features along the first direction is different than characteristics of the second plurality of geometric features along the second direction. Additionally or alternatively to one or more of the examples disclosed above, in some examples, the object is in contact with the first plurality of geometric features and the second plurality of geometric features and concurrently moves along the first direction or the second direction. Additionally or alternatively to one or more of the examples disclosed above, in some examples, the first plurality of geometric features and the second plurality of geometric features each includes a coefficient of friction along the first direction and the second direction, the coefficient of friction along the first direction is different than the coefficient of friction along the second direction. Additionally or alternatively to one or more of the examples disclosed above, in some examples, each feature of the first plurality of geometric features and each feature of the second plurality of geometric features is distributed linearly along the exterior surface of the housing. Additionally or alternatively to one or more of the examples disclosed above, in some examples, each feature of the first plurality of geometric features and each feature of the second plurality of geometric features is distributed circumferentially or radially along the exterior surface of the housing. Additionally or alternatively to one or more of the examples disclosed above, in some examples, a height of each feature of the first plurality of geometric features is uniform and a width of each feature of the first plurality of geometric features is uniform. Additionally or alternatively to one or more of the examples disclosed above, in some examples, a height of each feature of the second plurality of geometric features is uniform and a width of each feature of the second plurality of geometric features is uniform. Additionally or alternatively to one or more of the examples disclosed above, in some examples, the one or more first criteria further include a criterion that is satisfied when the pulse decay time characteristics is above a predetermined threshold associated with the first plurality of geometric features. Additionally or alternatively to one or more of the examples disclosed above, in some examples, the one or more second criteria further include a criterion that is satisfied when the pulse decay time characteristics is above a predetermined threshold associated with the second plurality of geometric features. Additionally or alternatively to one or more of the examples disclosed above, in some examples, each feature of the first plurality of geometric features and each feature of the second plurality of geometric features are interleaved together causing the object to be concurrently in contact with the features of the first plurality of geometric features and the features of the second plurality of geometric features when the object moves along the first direction or the second direction. Additionally or alternatively to one or more of the examples disclosed above, in some examples, a portion of the first plurality of geometric features and a portion of the second plurality of geometric features are interleaved together.

Some examples of the disclosure are directed to an electronic device. The electronic device can comprise: a housing including an exterior surface patterned with a first plurality of geometric features with first characteristics and a second plurality of geometric features with second characteristics different from the first characteristics; one or more sensors configured to detect signal inputs generated by vibrations caused by an object contacting and moving along the first plurality of geometric features and the second plurality of geometric features of the exterior surface; and processing circuitry configured to: in accordance with a determination that the detected signal inputs satisfy one or more first criteria, the one or more first criteria including a criterion that is satisfied when pulse decay time characteristics of the detected signal inputs generated by the object moving along a first direction correspond to the first characteristics of the first plurality of geometric features, determine that the object is moving along the first direction; and in accordance with a determination that the detected signal inputs satisfy one or more second criteria, the one or more second criteria including a criterion that is satisfied when pulse decay time characteristics of the detected signal inputs generated by the object moving along the second direction correspond to the second characteristics of the second plurality of geometric features, determine that the object is moving along a second direction. Each feature of the first plurality of geometric features and each feature of the second plurality of geometric features are interleaved together causing the object to be concurrently in contact with the features of the first plurality of geometric features and the features of the second plurality of geometric features when the object moves along the first direction or the second direction. Additionally or alternatively to one or more of the examples disclosed above, in some examples, the one or more first criteria further include a criterion that is satisfied when amplitude characteristics and pulse frequency characteristics of the detected signal inputs correspond to the first characteristics of the first plurality of geometric features. Additionally or alternatively to one or more of the examples disclosed above, in some examples, the one or more second criteria further include a criterion that is satisfied when amplitude characteristics and pulse frequency of the detected signal inputs correspond to the second characteristics of the second plurality of geometric features. Additionally or alternatively to one or more of the examples disclosed above, in some examples, the first plurality of geometric features and the second plurality of geometric features each includes a coefficient of friction along the first direction and the second direction, the coefficient of friction along the first direction is different than the coefficient of friction along the second direction.

Some examples of the disclosure are directed to a non-transitory computer readable storage medium. The non-transitory computer readable storage medium can store instructions, which when executed by an electronic device comprising processing circuitry, can cause the processing circuitry to perform any of the above methods.

Some examples of the disclosure are directed to an electronic device. The electronic device can comprise: a surface (e.g., external surface of a housing) patterned with a first plurality of geometric features with first characteristics and a second plurality of geometric features with second characteristics different from the first characteristics, one or more sensors configured to detect signal inputs (e.g., due to vibrations) caused by an object contacting and moving along the first plurality of geometric features and the second plurality of geometric features of the exterior surface; and processing circuitry. The processing circuitry can be configured to: in accordance with a determination that the detected signal inputs satisfy one or more first criteria, the one or more first criteria including a criterion that is satisfied when one or more pulse characteristics of the detected signal inputs generated by the object moving along a first direction correspond to the first characteristics of the first plurality of geometric features, determine that the object is moving along the first direction; and in accordance with a determination that the detected signal inputs satisfy one or more second criteria, the one or more second criteria including a criterion that is satisfied when the one or more pulse characteristics of the detected signal inputs generated by the object moving along a second direction correspond to the second characteristics of the second plurality of geometric features, determine that the object is moving along a second direction. Additionally or alternatively to one or more of the examples disclosed above, in some examples, the one or more pulse characteristics include at least one of: a pulse amplitude characteristic; a pulse decay time characteristic; an intra-pulse frequency; or a pulse repetition frequency. Additionally or alternatively to one or more of the examples disclosed above, in some examples, the one or more pulse characteristics include a pulse amplitude characteristic, a pulse decay time characteristic, an intra-pulse frequency, and a pulse repetition frequency. Additionally or alternatively to one or more of the examples disclosed above, in some examples, the processing circuitry can be further configured to determine a speed of the object moving in the first direction or the second direction.

Some examples of the disclosure are directed to an electronic device, comprising: a surface patterned with a plurality of pluralities of geometric features different characteristics; one or more sensors configured to detect signal inputs caused by an object contacting and moving along the plurality of pluralities of geometric features of the surface; and processing circuitry configured to determine a two-dimensional direction of movement of the object contacting and moving along the plurality of pluralities of geometric features of the surface in accordance with one or more pulse characteristics of the detected signal inputs.

Additionally or alternatively to one or more of the examples disclosed above, in some examples, the plurality of pluralities of geometric features includes a first plurality of geometric features with first characteristics, a second plurality of geometric features with second characteristics different than the first characteristics, a third plurality of geometric features with third characteristics different than the first characteristics and the second characteristics, and a fourth plurality of geometric features with fourth characteristics different than the first characteristics, the second characteristics, and the third characteristics. Additionally or alternatively to one or more of the examples disclosed above, in some examples, the processing circuitry is further configured to determine a two-dimensional velocity of the movement of the object contacting and moving along the plurality of pluralities of geometric features of the surface in accordance with the one or more pulse characteristics of the detected signal inputs.

Although examples of this disclosure have been fully described with reference to the accompanying drawings, it is to be noted that various changes and modifications will become apparent to those skilled in the art. Such changes and modifications are to be understood as being included within the scope of examples of this disclosure as defined by the appended claims.

The invention claimed is:

1. An electronic device, comprising:
a housing including an exterior surface patterned with a first plurality of geometric features with first characteristics and a second plurality of geometric features with second characteristics different from the first characteristics;
one or more sensors configured to detect signal inputs generated by vibrations caused by an object contacting and moving along the first plurality of geometric features and the second plurality of geometric features of the exterior surface; and
processing circuitry configured to:
in accordance with a determination that the detected signal inputs satisfy one or more first criteria, the one or more first criteria including a criterion that is satisfied when pulse decay time characteristics of the detected signal inputs generated by the object moving along a first direction correspond to the first characteristics of the first plurality of geometric features, determine that the object is moving along the first direction; and
in accordance with a determination that the detected signal inputs satisfy one or more second criteria, the one or more second criteria including a criterion that is satisfied when pulse decay time characteristics of the detected signal inputs generated by the object moving along a second direction correspond to the second characteristics of the second plurality of geometric features, determine that the object is moving along the second direction.

2. The electronic device of claim 1, wherein the one or more first criteria further include a criterion that is satisfied when amplitude characteristics of the detected signal inputs correspond to the first characteristics of the first plurality of geometric features.

3. The electronic device of claim 1, wherein the one or more second criteria further include a criterion that is satisfied when amplitude characteristics of the detected signal inputs correspond to the second characteristics of the second plurality of geometric features.

4. The electronic device of claim 1, wherein the one or more first criteria further include a criterion that is satisfied when pulse frequency characteristics of the detected signal inputs correspond to the first characteristics of the first plurality of geometric features.

5. The electronic device of claim 1, wherein the one or more second criteria further include a criterion that is satisfied when pulse frequency characteristics of the detected signal inputs correspond to the second characteristics of the second plurality of geometric features.

6. The electronic device of claim 1, wherein characteristics of the first plurality of geometric features along the first direction is different than characteristics of the first plurality of geometric features along the second direction.

7. The electronic device of claim 1, wherein characteristics of the second plurality of geometric features along the first direction is different than characteristics of the second plurality of geometric features along the second direction.

8. The electronic device of claim 1, wherein the object is in contact with the first plurality of geometric features and the second plurality of geometric features and concurrently moves along the first direction or the second direction.

9. The electronic device of claim 1, wherein the first plurality of geometric features and the second plurality of geometric features each includes a coefficient of friction along the first direction and the second direction, the coefficient of friction along the first direction is different than the coefficient of friction along the second direction.

10. The electronic device of claim 1, wherein each feature of the first plurality of geometric features and each feature of the second plurality of geometric features is distributed linearly along the exterior surface of the housing.

11. The electronic device of claim 1, wherein each feature of the first plurality of geometric features and each feature of the second plurality of geometric features is distributed circumferentially along the exterior surface of the housing.

12. The electronic device of claim 1, wherein a height of each feature of the first plurality of geometric features is uniform and a width of each feature of the first plurality of geometric features is uniform; and
wherein a height of each feature of the second plurality of geometric features is uniform and a width of each feature of the second plurality of geometric features is uniform.

13. The electronic device of claim 1, wherein the one or more first criteria further include a criterion that is satisfied when the pulse decay time characteristics are above a predetermined threshold associated with the first plurality of geometric features.

14. The electronic device of claim 1, wherein the one or more second criteria further include a criterion that is satisfied when the pulse decay time characteristics are above a predetermined threshold associated with the second plurality of geometric features.

15. The electronic device of claim 1, wherein a portion of the first plurality of geometric features and a portion of the second plurality of geometric features are interleaved together.

16. The electronic device of claim 1, wherein each feature of the first plurality of geometric features and each feature of the second plurality of geometric features are interleaved together such that when the object moves in the first direction or the second direction the object concurrently contacts the features of the first plurality of geometric features and the features of the second plurality of geometric features.

17. An electronic device, comprising:
a housing including an exterior surface patterned with a first plurality of geometric features with first characteristics and a second plurality of geometric features with second characteristics different from the first characteristics;

one or more sensors configured to detect signal inputs generated by vibrations caused by an object contacting and moving along the first plurality of geometric features and the second plurality of geometric features of the exterior surface; and processing circuitry configured to:
- in accordance with a determination that the detected signal inputs satisfy one or more first criteria, the one or more first criteria including a criterion that is satisfied when pulse decay time characteristics of the detected signal inputs generated by the object moving along a first direction correspond to the first characteristics of the first plurality of geometric features, determine that the object is moving along the first direction; and
- in accordance with a determination that the detected signal inputs satisfy one or more second criteria, the one or more second criteria including a criterion that is satisfied when pulse decay time characteristics of the detected signal inputs generated by the object moving along a second direction correspond to the second characteristics of the second plurality of geometric features, determine that the object is moving along the second direction;

wherein each feature of the first plurality of geometric features and each feature of the second plurality of geometric features are interleaved together causing the object to be concurrently in contact with the features of the first plurality of geometric features and the features of the second plurality of geometric features when the object moves along the first direction or the second direction.

18. The electronic device of claim 17, wherein the one or more first criteria further include a criterion that is satisfied when amplitude characteristics and pulse frequency characteristics of the detected signal inputs correspond to the first characteristics of the first plurality of geometric features.

19. The electronic device of claim 17, wherein the one or more second criteria further include a criterion that is satisfied when amplitude characteristics and pulse frequency of the detected signal inputs correspond to the second characteristics of the second plurality of geometric features.

20. The electronic device of claim 17, wherein the first plurality of geometric features and the second plurality of geometric features each includes a coefficient of friction along the first direction and the second direction, the coefficient of friction along the first direction is different than the coefficient of friction along the second direction.

* * * * *